US011739808B2

(12) United States Patent
Kato

(10) Patent No.: US 11,739,808 B2
(45) Date of Patent: Aug. 29, 2023

(54) DAMPER

(71) Applicant: PIOLAX, INC., Kanagawa (JP)

(72) Inventor: Kouichi Kato, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 659 days.

(21) Appl. No.: 16/968,516

(22) PCT Filed: Mar. 22, 2019

(86) PCT No.: PCT/JP2019/012151
§ 371 (c)(1),
(2) Date: Aug. 7, 2020

(87) PCT Pub. No.: WO2019/188808
PCT Pub. Date: Oct. 3, 2019

(65) Prior Publication Data
US 2020/0408270 A1 Dec. 31, 2020

(30) Foreign Application Priority Data

Mar. 28, 2018 (JP) .................. 2018-062826

(51) Int. Cl.
*F16F 9/32* (2006.01)
*B60R 7/06* (2006.01)
(52) U.S. Cl.
CPC .............. *F16F 9/3242* (2013.01); *B60R 7/06* (2013.01); *F16F 9/3214* (2013.01)
(58) Field of Classification Search
CPC .......... F16F 9/3242; F16F 9/3214; B60R 7/06
See application file for complete search history.

(56) References Cited

U.S. PATENT DOCUMENTS

| 5,165,324 A | 11/1992 | Maruoka | |
|---|---|---|---|
| 5,535,861 A * | 7/1996 | Young | F16F 9/0227 188/300 |
| 2005/0279596 A1* | 12/2005 | Gassner | F16F 9/3214 188/282.8 |

(Continued)

FOREIGN PATENT DOCUMENTS

| JP | H04-064630 U | 6/1992 |
| WO | 2009/028264 A1 | 3/2009 |
| WO | 2012/073663 A1 | 6/2012 |

OTHER PUBLICATIONS

Japanese Patent No. JP 2009204158 to Maeda published on Sep. 10, 2009.*

(Continued)

*Primary Examiner* — Pamela Rodriguez
(74) *Attorney, Agent, or Firm* — Nakanishi IP Associates, LLC

(57) ABSTRACT

Provided is a damper capable of securely assembling a cap on an outer circumference of a rod while reducing a diameter of the cap and reducing an outer diameter of a cylinder. A damper has a cylinder, a rod, and a cap attached to an opening of the cylinder. The rod has a piston on its tip side and a mounting portion mounted on the other of a pair of members on its base end side, the cap has a main body that extends in an axial direction of the rod, and the main body is formed with a receiving opening that can receive the rod from an outside in a radial direction thereof.

4 Claims, 28 Drawing Sheets

(56) References Cited

U.S. PATENT DOCUMENTS

2010/0162522 A1    7/2010    Han et al.

OTHER PUBLICATIONS

WO document No. 2018/190256 to Kato et al. published on Oct. 18, 2018.*
British Patent No. GB 2487229 to Teng-Yi Juan published on Jul. 18, 2012.*
WO document No. 2019/188810 to Kato published on Oct. 3, 2019.*
International Search Report issued in PCT/JP2019/012151 dated Jun. 25, 2019 with English Translation (3 pages).

* cited by examiner

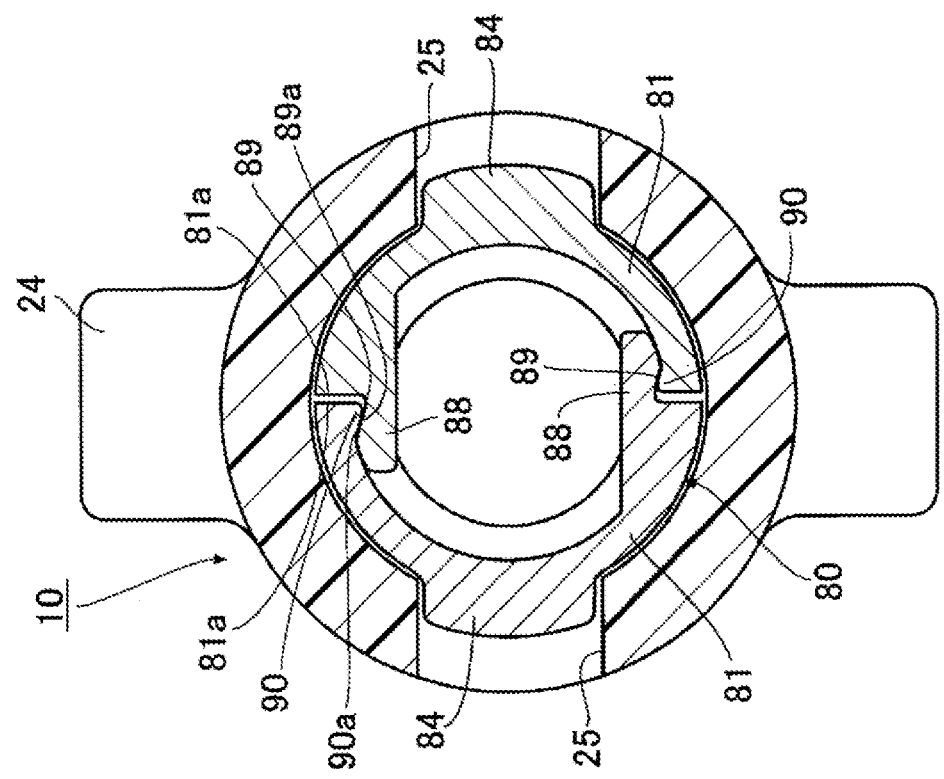
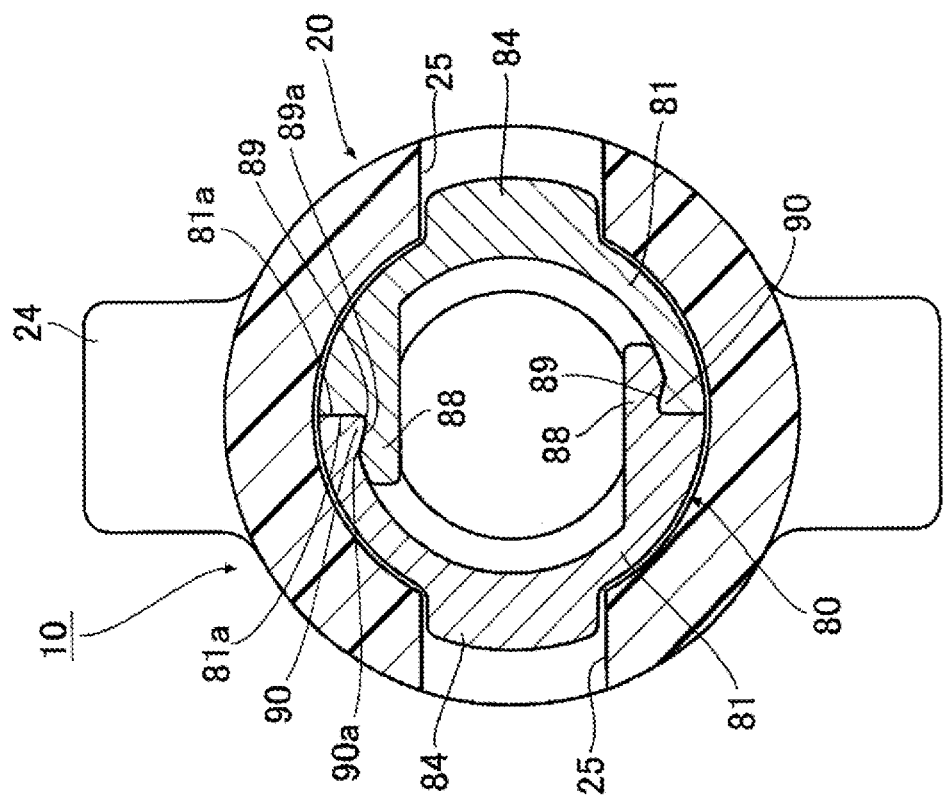

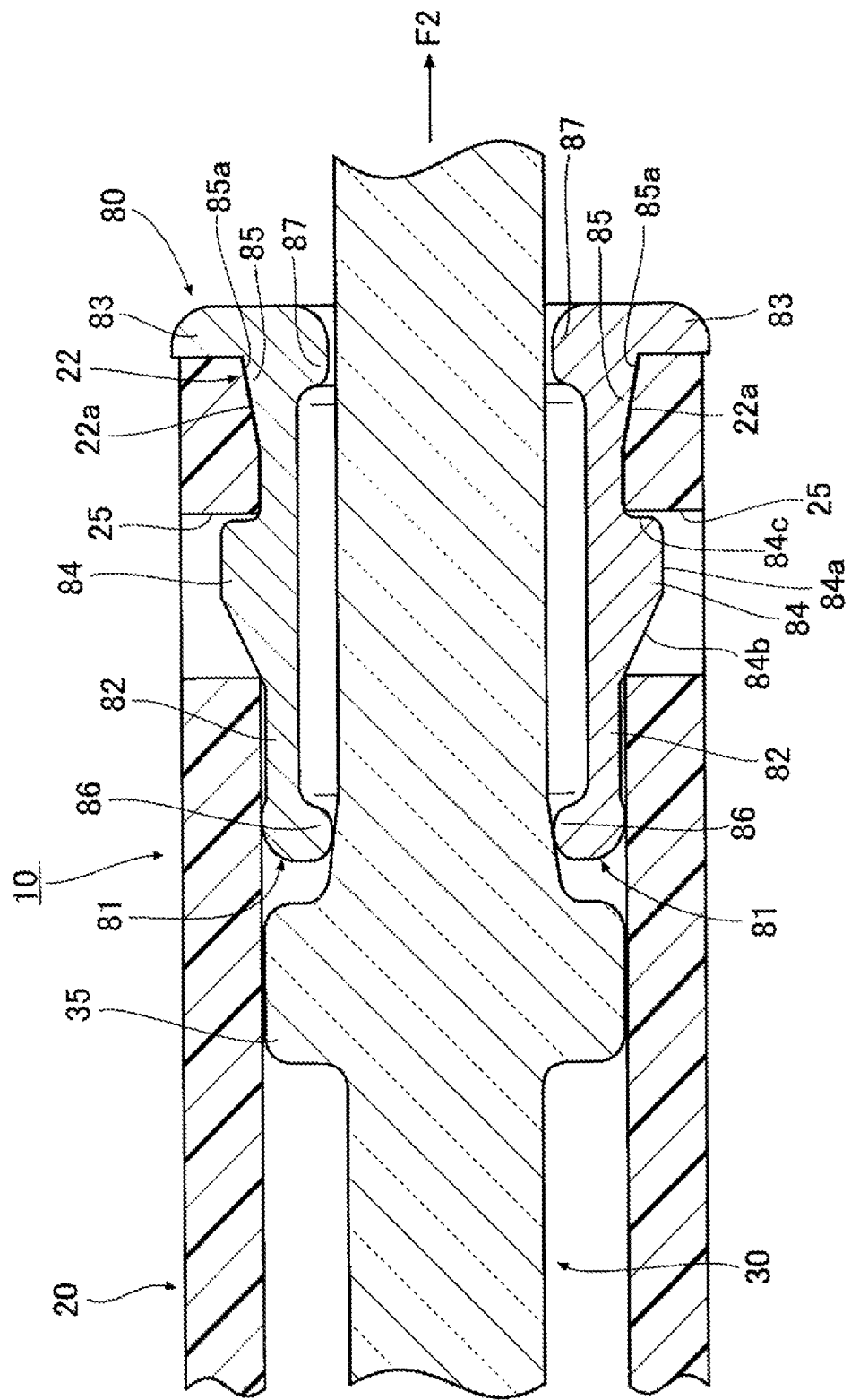

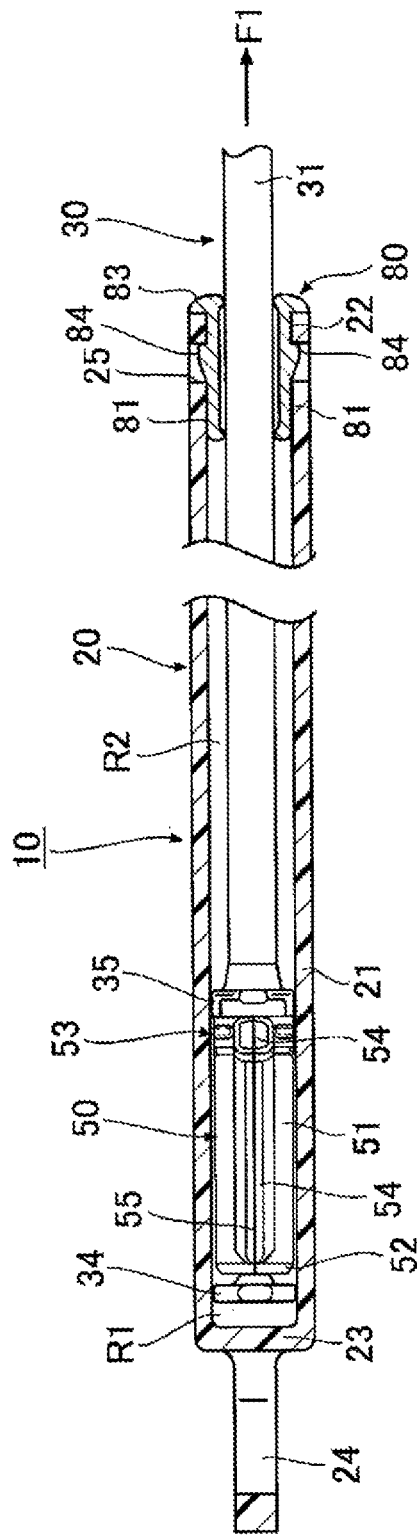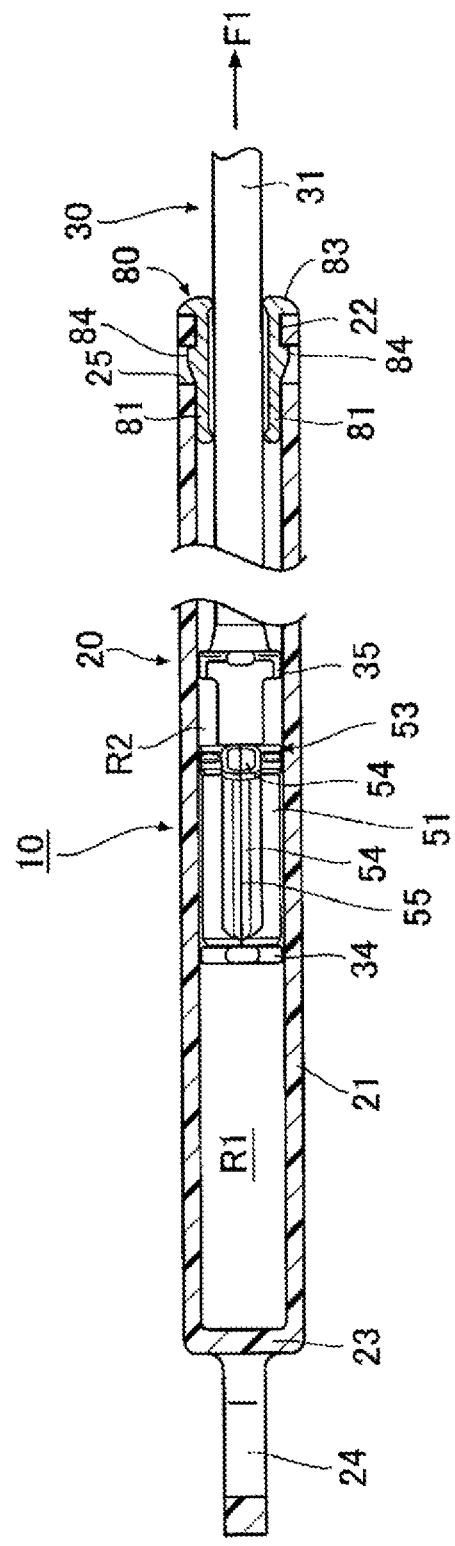

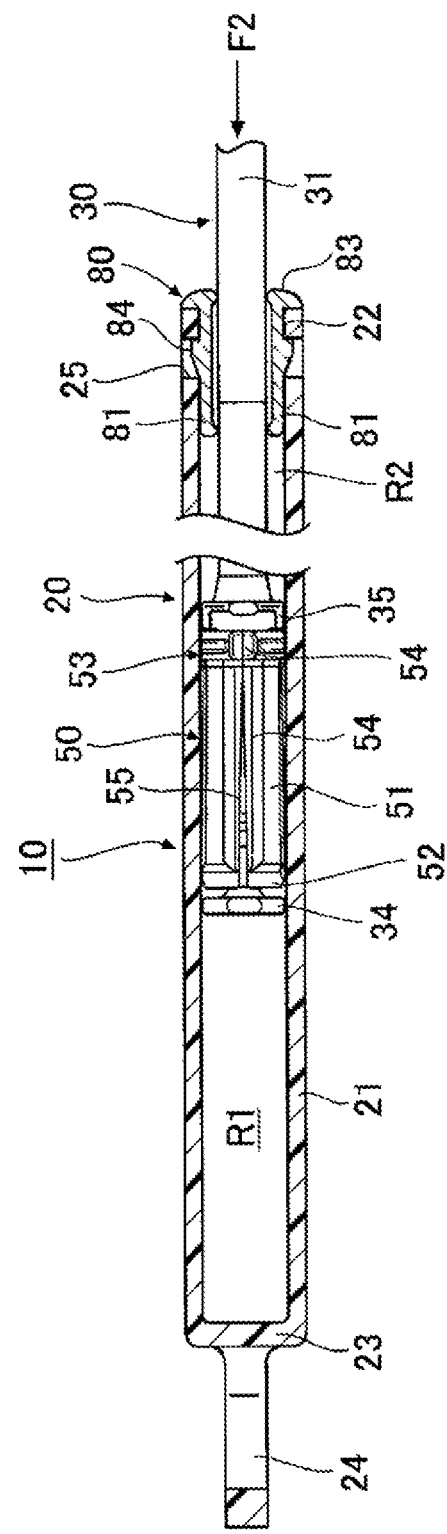

DAMPER

TECHNICAL FIELD

The present invention relates to a damper used for damping, for example, an opening and closing operation of a glove box of an automobile.

BACKGROUND ART

For example, in the glove box of the automobile, the damper may be used in order to prevent a lid from opening suddenly and allow the lid to open gently.

As such a damper, PATENT LITERATURE 1 below describes a damper device including a cylinder having a base end side opened, a rod inserted into the cylinder, a piston that is provided on a tip side of the rod so as to have a larger diameter than the rod and has an O-ring having an elastic force thereon, a cap attached to an opening of the cylinder, and a spring disposed between the rod and the cap and urging the rod in a direction projecting from the opening of the cylinder. A mounting portion for mounting the damper on a glove box or the like is formed on the base end side of the rod. Further, the cap is formed with a through-hole through which the rod is inserted. When assembling the above damper device, the rod is inserted into the cylinder, the spring is fitted onto an outer circumference of the rod, and in that state, the base end of the rod is inserted through the through-hole of the cap, and then the cap is pushed in and attached to the opening of the cylinder, so that the damper device can be assembled.

CITATION LIST

Patent Literature

PATENT LITERATURE 1: WO 09/028264

SUMMARY OF THE INVENTION

Problems to be Solved by the Invention

By the way, in recent years, downsizing of the damper has been desired. In order to address this point with the damper device of PATENT LITERATURE 1, for example, it is conceivable to make the rod thinner and to reduce an outer diameter of the cylinder accordingly. However, since a size of the mounting portion on the rod base end side that is inserted into the through-hole of the cap cannot be changed because it depends on a shape of the mating side, a shape of the rod will be formed such that the base end side of the rod have an enlarged diameter. Further, since the piston having an enlarged diameter is provided on the tip side of the rod, it cannot be inserted into the through-hole of the cap from the tip side or the other end side of the rod.

Therefore, an object of the present invention is to provide a damper capable of securely assembling the cap on the outer circumference of the rod while reducing a diameter of the cap and reducing the outer diameter of the cylinder.

Solution to the Problems

In order to achieve the above object, the present invention is a damper that is attached to a pair of members approaching or separating from each other and gives a damping force when the pair of members approaches or separates from each other, including: a tubular cylinder that has an opening formed at its end portion and is connected to one of the pair of members; a rod that is movably inserted from its tip through the opening of the cylinder; and a cap that is attached to the opening of the cylinder and prevents the rod from slipping off from the opening of the cylinder. The rod has a piston on its tip side and a mounting portion mounted on the other of the pair of members on its base end side. The cap has a main body that extends in an axial direction of the rod, and the main body is formed with a receiving opening that can receive the rod from an outside in a radial direction thereof.

Effects of the Invention

According to the present invention, since the cap has a shape that can be assembled from the outside in the radial direction of the rod, the cap can be reliably attached to the outer circumference of the rod, and there is no need to provide the cap with a hole through which an engaging portion and the mounting portion of the rod can pass, so that the diameter of the cap can be reduced and the outer diameter of the cylinder can be reduced.

BRIEF DESCRIPTION OF THE DRAWINGS

FIG. 2A is a perspective view, FIG. 2B is a plan view, and FIG. 2C is a side view thereof.

FIG. 3A is a perspective view, and FIG. 3B is a perspective view thereof when viewed from a different direction from FIG. 3A.

FIG. 4A is a plan view, FIG. 4B is a side view, FIG. 4C is a cross-sectional view taken along a line A-A of FIG. 4A, FIG. 4D is a cross-sectional view taken along a line B-B of FIG. 4B, and FIG. 4E is a cross-sectional view taken along a line C-C of FIG. 4B.

FIG. 6A is a perspective view in an assembled state, and FIG. 6B is a perspective view before being assembled.

FIG. 11A is a cross-sectional view taken along a line K-K of FIG. 9B, and FIG. 11B is a cross-sectional view of a state in which the rod moves from the state of FIG. 11A and the cap increases in diameter.

FIG. 12 is a cross-sectional view taken along a line L-L of FIG. 10.

FIGS. 13A and 13B illustrate a usage state of the damper, FIG. 13A is an explanatory view of a state in which the rod is stationary, and FIG. 13B is an explanatory view of a state in which the damping force of the damper acts.

FIG. 14 illustrates the usage state of the damper, and is an explanatory view of a state in which the damping force of the damper is released.

FIG. 19A is an enlarged cross-sectional view of the main portion, and FIG. 19B is an enlarged explanatory view of the main portion for explaining a state where the piston is in pressure contact with the inner circumference of the cylinder in FIG. 19A.

FIG. 20A is a perspective view of a state in which the cap constituting the damper is assembled, and FIG. 20B is a perspective view of a state before the cap is assembled.

FIG. 23A is a perspective view of a state before the cap constituting the damper is assembled, and FIG. 23B is a perspective view of a state in which the cap is assembled.

FIG. 29A is a perspective view of the cap constituting the damper, and FIG. 29B is a perspective view of the cap when viewed from a different direction from FIG. 29A.

DESCRIPTION OF THE EMBODIMENTS

Hereinafter, a first embodiment of a damper according to the present invention will be described with reference to FIGS. 1 to 19B.

Figure 1:
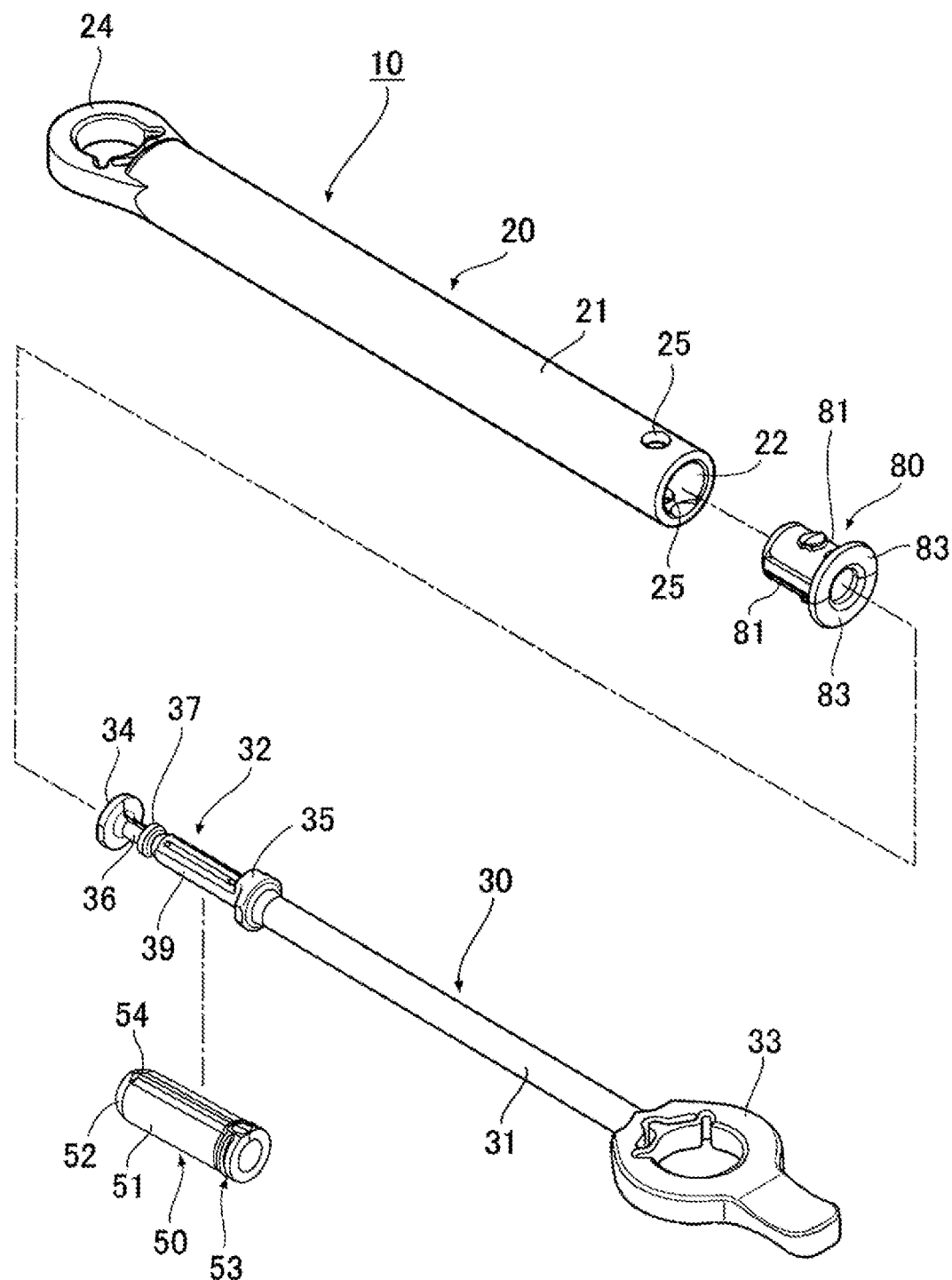
FIG. 1 is an exploded perspective view illustrating a first embodiment of a damper according to the present invention.

A damper 10 illustrated in FIG. 1 is attached to a pair of members approaching or separating from each other, and gives a damping force when the pair of members approaches or separates from each other. For example, the damper 10 can be used to damp a glove box, a lid, or the like that is openably and closably attached to an opening of a housing portion provided in an instrument panel of an automobile. In the following embodiments, one member will be described as a fixed body such as a housing portion of the instrument panel, and the other member will be described as an opening/closing body such as a glove box or a lid openably and closably attached to the opening of the fixed body, however, the pair of members is not particularly limited thereto as long as they can approach and separate from each other.

As illustrated in FIG. 1, the damper 10 of this embodiment mainly includes a cylinder 20 having a substantially cylindrical shape, a rod 30 movably inserted into the cylinder 20, a piston 50 made of an elastic resin material attached to an axial tip of the rod 30, and a cap 80 that is attached to an opening 22 of the cylinder 20 and prevents the rod 30 from slipping off from the opening 22 of the cylinder 20.

As illustrated in FIG. 1, FIG. 13A, and FIG. 13B, the cylinder 20 of this embodiment has a substantially cylindrical wall portion 21 extending by a predetermined length, and one end in an axial direction of the cylinder 20 is open to form the opening 22. The other end of the wall portion 21 is closed by an end wall 23. An annular mounting portion 24 is provided outside the end wall 23, so that the cylinder 20 can be mounted to the one member such as an instrument panel through the mounting portion 24. Circular fitting holes 25, 25 are formed on one end side of the wall portion 21 so as to face each other in a circumferential direction of the wall portion 21 (see FIG. 1). As illustrated in FIG. 9B, on an inner circumference on the opening 22 side of the cylinder 20, stopper receiving surfaces 22a, 22a are formed by cutting portions facing each other in the circumferential direction into a substantially flat surface shape. An insertion stopper portion 85 of the cap 80, which will be described below, contacts the stopper receiving surface 22a (see FIG. 9B). Note that the other end of the wall portion 21 may be opened and a cap provided with an orifice may be attached thereto, and a mounting portion may be provided at a predetermined axial position on an outer circumference of the wall portion 21. Further, an outer diameter of the cylinder 20 is preferably 12 mm or less, and more preferably 8 mm or less.

The rod 30 is movably inserted into the cylinder 20 from the tip of the rod through the opening 22 of the cylinder 20, and has the piston 50 on its tip side and a mounting portion 33 mounted on the other (the opening/closing body such as a glove box or a lid) of the pair of members on its base end side. More specifically, the rod 30 in this embodiment has a cylindrical shaft portion 31 and a piston mounting portion 32 which is continuously provided to a tip of the shaft portion 31 and on which the piston 50 is mounted. The mounting portion 33 having an annular shape is provided on the base end side of the shaft portion 31, and the rod 30 can be attached to the other member such as a glove box through the mounting portion 33. Note that the rod 30 in this embodiment is configured such that the piston 50 separate from the rod 30 is disposed and fixed on the tip side, however, the piston may be integrally provided on the tip side of the rod.

Figure 2A:
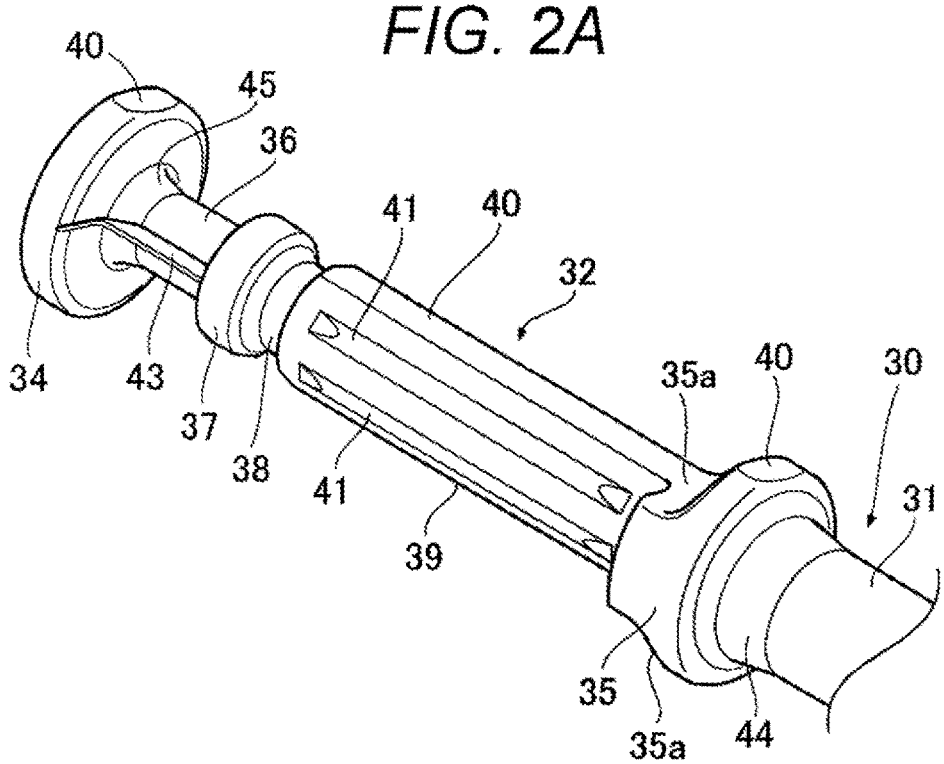
FIGS. 2A to 2C illustrate a rod constituting the damper.
Figure 2B:
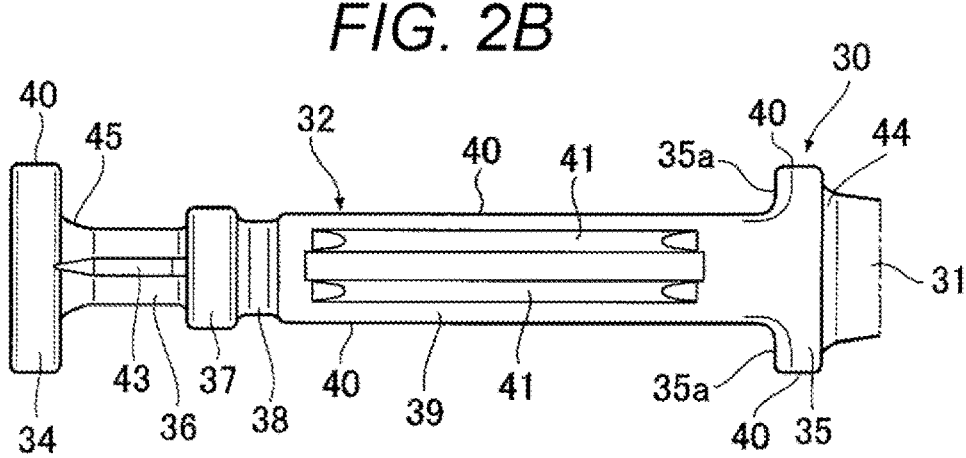
Figure 2C:
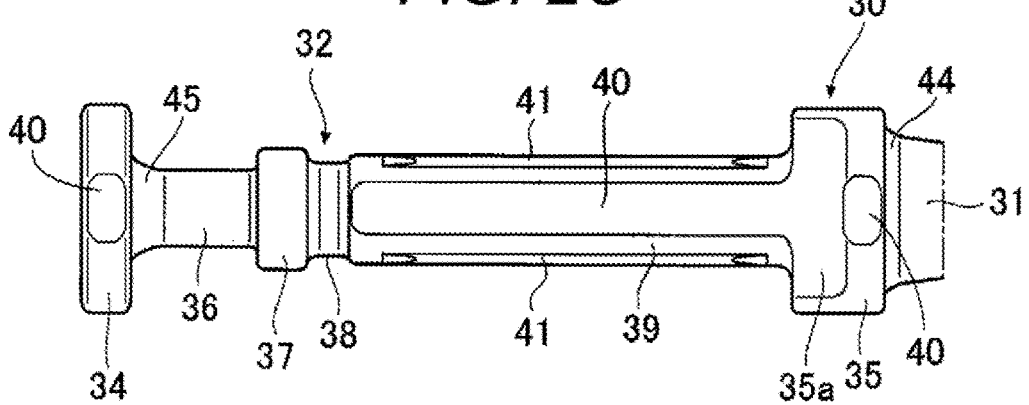

Referring also to FIGS. 2A to 2C, the piston mounting portion 32 is provided at the most tip end in an axial direction of the rod 30, and has a substantially disc-shaped first engaging portion 34, and a stopper portion 35 provided on the base end side of the rod with a predetermined distance from the first engaging portion 34.

Figure 16A:
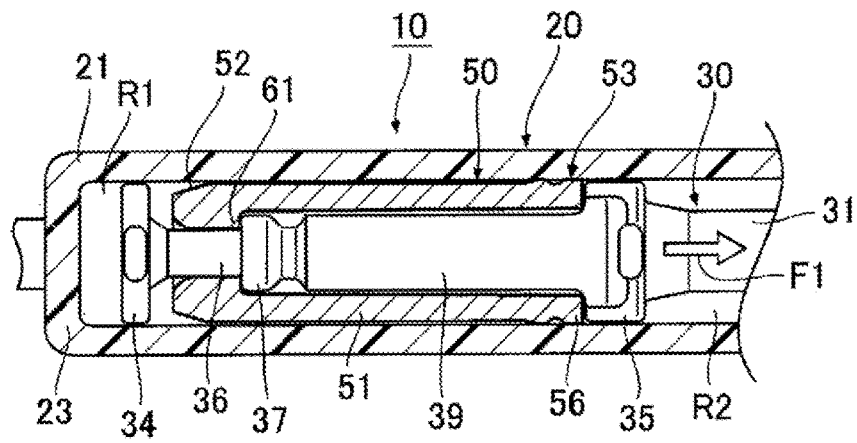
FIG. 16A is an enlarged cross-sectional view of the main portion in a state where the rod in stationary.
Figure 16B:
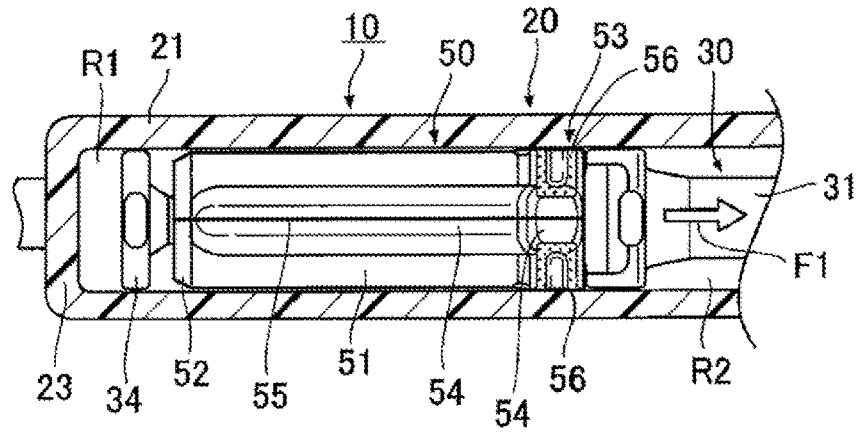
FIG. 16B is an enlarged explanatory view of the main portion for explaining a state where the piston is in pressure contact with an inner circumference of the cylinder in FIG. 16A.
Figure 17A:
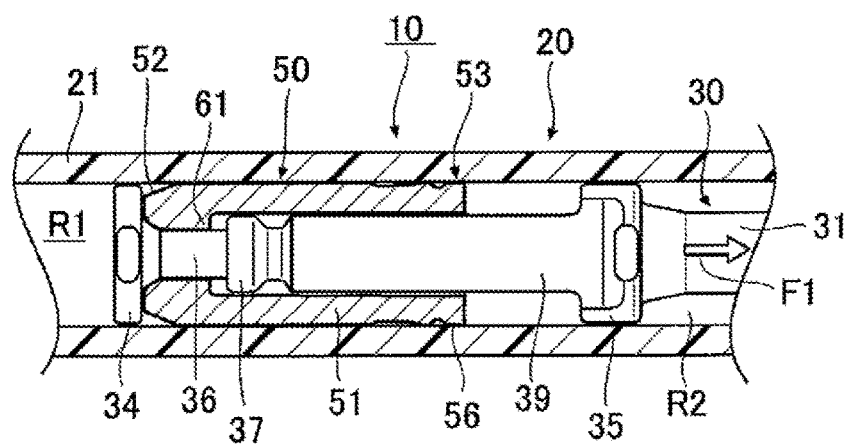
FIG. 17A is an enlarged cross-sectional view of the main portion in a state where the rod moves in the damping direction of the damper.
Figure 17B:
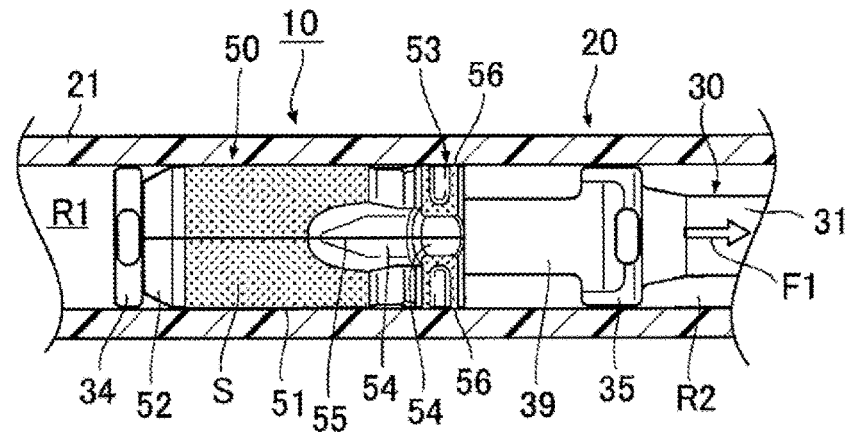
FIG. 17B is an enlarged explanatory view of the main portion for explaining a state where the piston is in pressure contact with the inner circumference of the cylinder in FIG. 17A.

The first engaging portion 34 is a portion engaging with the piston 50 as illustrated in FIGS. 17A and 17B when the rod 30 moves in a damping direction that is a direction in which the damper gives the damping force (here, the first engaging portion 34 engages with one end of the piston 50). The damping direction of the damper in this embodiment means a direction, in which the first engaging portion 34 moves away from the end wall 23 (see FIGS. 13A and 13B) of the cylinder 20 and an amount of withdrawal of the rod 30 from the opening 22 of the cylinder 20 increases (see FIGS. 7A, 7B, and an arrow F1 in FIGS. 16A, 16B, 17A, 17B).

The stopper portion 35 has a substantially circular protrusion shape as a whole, and cut portions 35a, 35a are formed by cutting a wall portion at positions on the first engaging portion 34 side on both sides in a circumferential direction of the stopper portion 35. Each cut portion 35a is provided with a flat surface continuous with a flat surface 40 provided on a second pillar portion 39 described below (see FIG. 2A). Outer diameters of the first engaging portion 34 and the stopper portion 35 are formed larger than an inner diameter of the piston 50, a distance between the first engaging portion 34 and the stopper portion 35 is formed longer than an axial length of the piston 50, and the piston 50 is mounted between the first engaging portion 34 and the stopper portion 35 so as to be capable of expanding and contracting in its axial direction.

The piston mounting portion 32 further has a substantially columnar first pillar portion 36 extending from an inner surface side of the first engaging portion 34 to the base end side of the rod, a second engaging portion 37 having a substantially circular protrusion shape continuously provided to a tip in an extending direction of the first pillar portion 36 and engaging with the piston 50 when the rod 30 moves in a return direction opposite to the damping direction of the damper (see an arrow F2 in FIG. 14), and a substantially columnar second pillar portion 39 extending from the base end side of the second engaging portion 37 to the rod base end side through a recess 38 and connected to the stopper portion 35.

The return direction (hereinafter, also simply referred to as "return direction") opposite to the damping direction of the damper in this embodiment means that the first engaging portion 34 approaches the end wall 23 (see FIGS. 13A and 13B) of the cylinder 20 and the rod 30 moves in a direction in which the amount of pushing the rod 30 into the cylinder 20 increases (see the arrow F2 in FIGS. 14, 18A, 18B, 19A, 19B).

Figure 15:
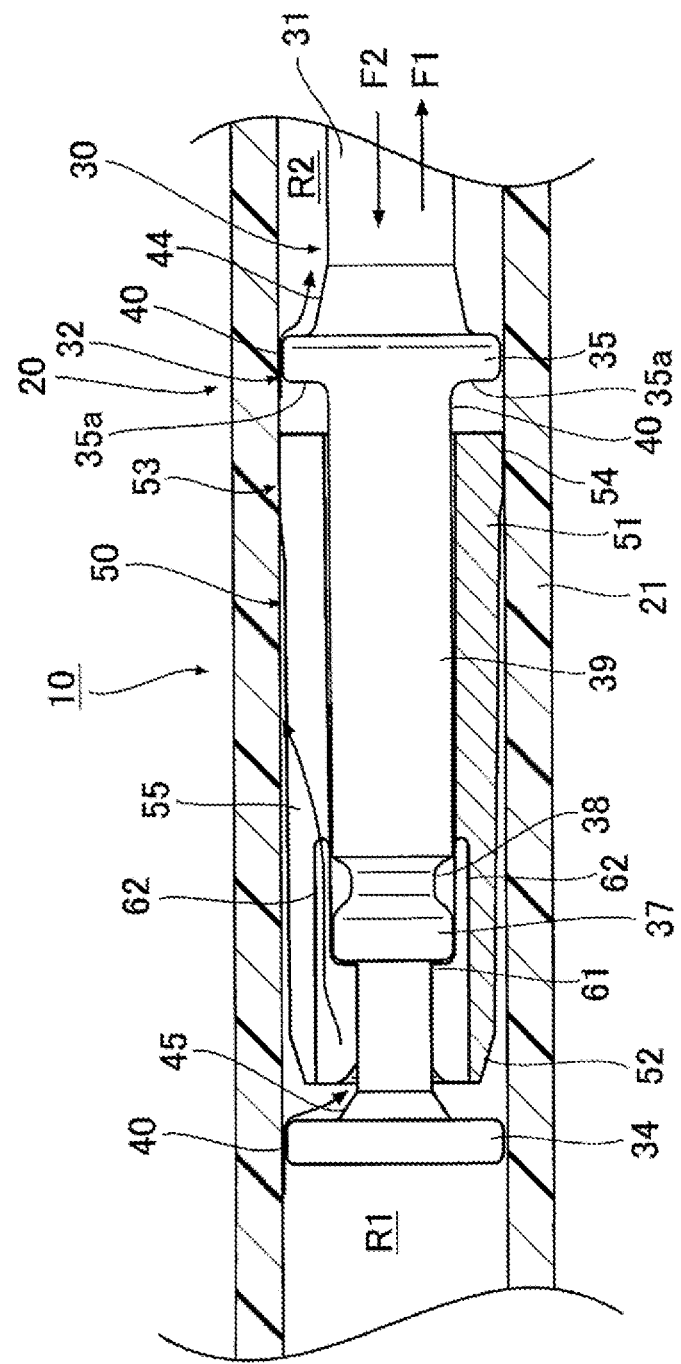
FIG. 15 is an enlarged explanatory view of a main portion of the damper.
Figure 18A:
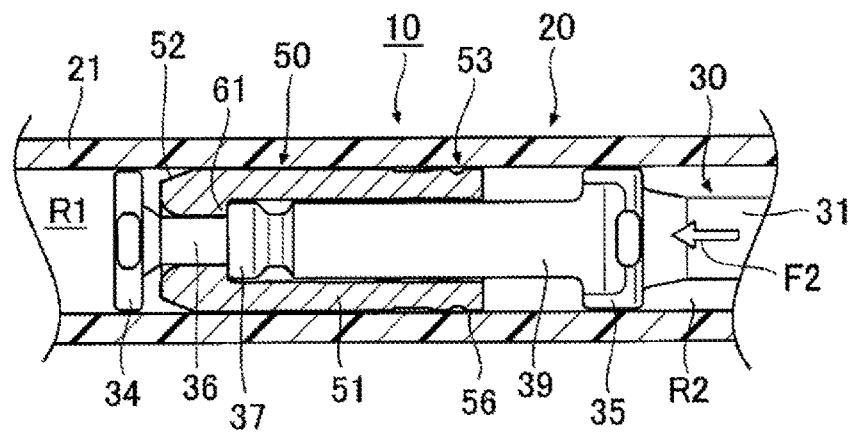
FIG. 18A is an enlarged cross-sectional view of the main portion in a state where the rod moves in the return direction of the damper.
Figure 19A:
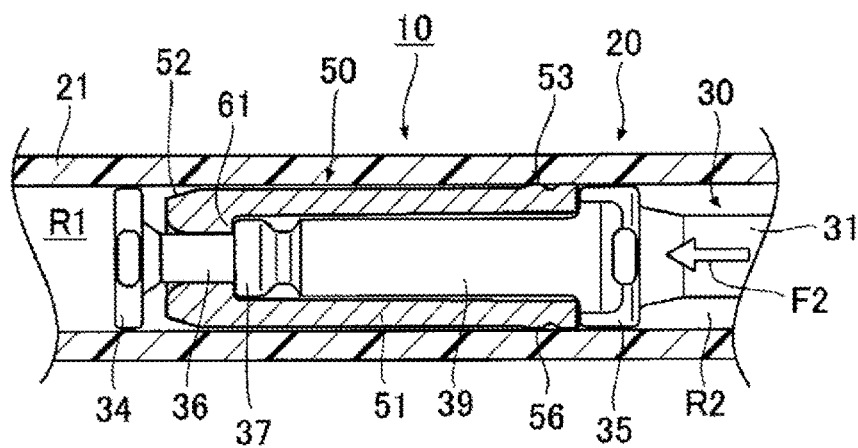
FIGS. 19A and 19B illustrate a state in which the piston returns to its original shape from a state in which the piston illustrated in FIG. 18B is contracted.

As illustrated in FIGS. 15, 18A and 19A, the second engaging portion 37 is disposed on the return direction side of the damper with respect to a pressure contact portion 53 described below of the piston 50. The second engaging portion 37 and the second pillar portion 39 have a larger diameter than the first pillar portion 36 and a smaller diameter than the first engaging portion 34 and the stopper portion 35, and the second pillar portion 39 is formed longer than the first pillar portion 36.

Figure 18B:
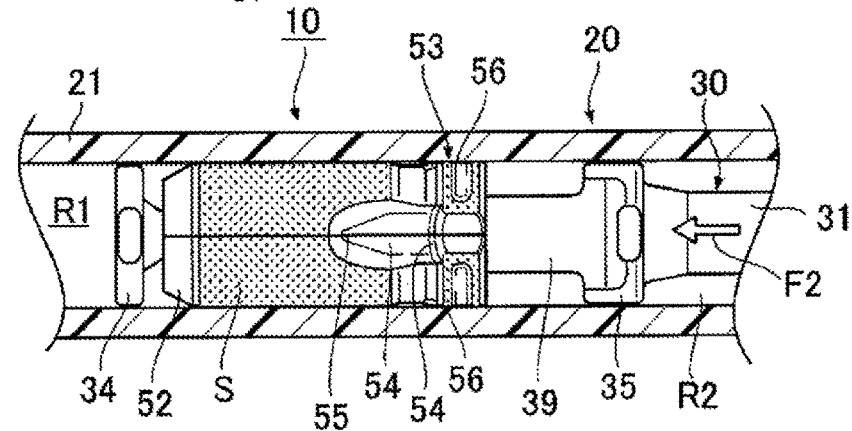
FIG. 18B is an enlarged explanatory view of the main portion for explaining a state where the piston is in pressure contact with the inner circumference of the cylinder in FIG. 18A.
Figure 19B:
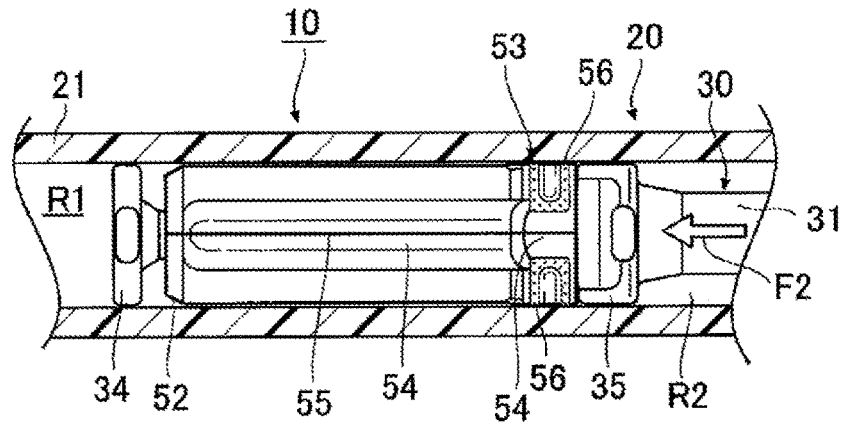

In this embodiment, when the rod 30 moves in the return direction of the damper, as illustrated in FIGS. 18A and 19A, the second engaging portion 37 engages with an engaged portion 61 described below of the piston 50. When the rod 30 further moves in the return direction of the damper from a state illustrated in FIGS. 18A and 18B, the piston 50 that contracts in the axial direction and is in pressure contact with the inner circumference of the cylinder elastically returns to an extended state (see FIGS. 19A and 19B), however, as illustrated in FIGS. 19A and 19B, when the piston 50 extends the longest, the stopper portion 35 engages with the other end of the piston 50 to restrict the piston 50 from extending.

As illustrated in FIG. 2A, flat surfaces 40, 40 cut in a plane shape in the axial direction of the rod 30 are formed parallel to each other at two locations in the circumferential direction on outer circumferences of the first engaging portion 34, the stopper portion 35, the first pillar portion 36, and the second pillar portion 39. The flat surface 40 formed on the second pillar portion 39 is flush with the flat surfaces of the cut portions 35a, 35a provided on the stopper portion 35. The flat surface 40 forms a gap with the inner circumference of the cylinder 20 and the inner circumference of the piston 50.

As illustrated in FIG. 2A, a plurality of protrusions 41 contacting the inner circumference of the piston 50 from the second engaging portion 37 side to the base end side of the rod 30 is formed to extend in the axial direction and side by side at predetermined intervals in the circumferential direction. Specifically, in this embodiment, as illustrated in FIG. 2C, on both sides in the circumferential direction of the flat surface 40 on the outer circumference of the second pillar portion 39, the protrusions 41, 41 extending in the axial direction of the rod 30 are provided projecting in a length extending from a tip portion of the rod 30 near the second engaging portion 37 to reach a front portion of the stopper portion 35 (in this embodiment, the protrusions 41 are provided at four places in total). The protrusion 41 forms a gap between the inner circumference of the piston 50 and the outer circumference of the second pillar portion 39.

As illustrated in FIGS. 2A and 2B, a groove 43 is formed at a predetermined depth in the axial direction of the first pillar portion 36 from one position in the circumferential direction of the inner surface of the first engaging portion 34. As illustrated in FIG. 2B, the groove 43 is provided between the flat surfaces 40, 40 provided on the first engaging portion 34 and in the middle thereof. As illustrated in FIG. 17A, with the groove 43, even when one end surface of the piston 50 is in contact with the inner surface of the first engaging portion 34, a gap can be secured between the inner surface of the first engaging portion 34 and the one end surface of the piston 50, and a gap can be secured between the outer circumference of the first pillar portion 36 and the inner circumference of the engaged portion 61 (see FIG. 4C) of the piston 50.

An inclined portion 44 having a diameter gradually reduced toward the base end of the rod 30 is formed on a tip side outer circumference of the shaft portion 31, that is, an outer circumference of a connecting portion between the shaft portion 31 and the stopper portion 35. Further, an inclined portion 45 having a diameter gradually reduced toward the base end of the rod 30 is also formed on a tip side outer circumference of the first pillar portion 36.

As described above, the rod 30 having the above-described structure is inserted into the cylinder 20 from the first engaging portion 34 side at the tip and is movably disposed in the cylinder 20. At this time, as illustrated in FIGS. 13A, 13B, 14, a first chamber R1 located on the return direction side of the rod 30 in the damper and a second chamber R2 located on the damping direction side of the rod 30 in the damper are formed with the first engaging portion 34 of the rod 30 as a boundary. In this embodiment, the first chamber R1 is formed on the end wall 23 side of the cylinder 20, and the second chamber R2 is formed on the opening 22 side of the cylinder 20. Further, in the rod 30 described above, the shaft portion 31, the mounting portion 33, the first engaging portion 34, the stopper portion 35, the second engaging portion 37, the first pillar portion 36, the second pillar portion 39, the protrusions 41 and the like are all integrally formed.

Next, the piston 50 disposed on the tip side of the rod 20 will be described with reference to FIGS. 3A to 5. The piston 50 in this embodiment extends by a predetermined length in the axial direction of the rod 30, is attached to the base end of the first engaging portion 34 of the rod 30 so as to surround the rod 30, and is made of the elastic resin material. The piston 50 is formed of, for example, a rubber elastic material such as rubber or elastomer, or a resin material such as sponge, and is configured such that the diameter increases when the piston 50 is compressed in the axial direction, and the diameter is reduced when the piston 50 is pulled in the axial direction. When the rod 30 moves in the damping direction of the damper, the piston 50 follows the rod 30 to move in the damping direction of the damper, and also when the rod 30 moves in the return direction of the damper, the piston 50 follows the rod 30 to move in the return direction of the damper.

The piston 50 of this embodiment has a main body 51, that extends by a predetermined length so as to form a substantially cylindrical shape and has an outer circumference formed in a circular shape. The outer circumference of one end portion 52 (an end portion located on the first engaging portion 34 side when the piston 50 is mounted on the rod 30) of the main body 51 on the opposite side to the damping direction of the damper has a tapered shape in which the diameter is gradually reduced toward one end surface in the axial direction of the main body 51.

The pressure contact portion 53 is provided on an outer circumference of the other end portion of the main body 51 on the damping direction side of the damper (the end located on the stopper portion 35 side in a state where the piston 50 is mounted on the rod 30), is constantly in pressure contact with the inner circumference of the cylinder 20, and applies the damping force to the piston 50 when the rod 30 moves (both in a damping direction of the damper and in the return direction of the damper).

In the following description, one end portion or one end of the piston opposite to the damping direction of the damper is simply referred to as "one end portion" or "one end", and the other end portion or the other end of the damper in the damping direction is simply referred to as "the other end portion" or "the other end".

Figure 4A:
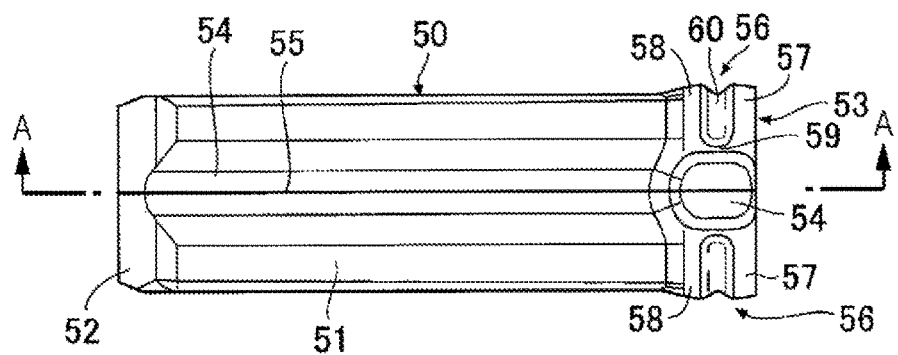
FIGS. 4A to 4E illustrate the piston constituting the damper.
Figure 4B:
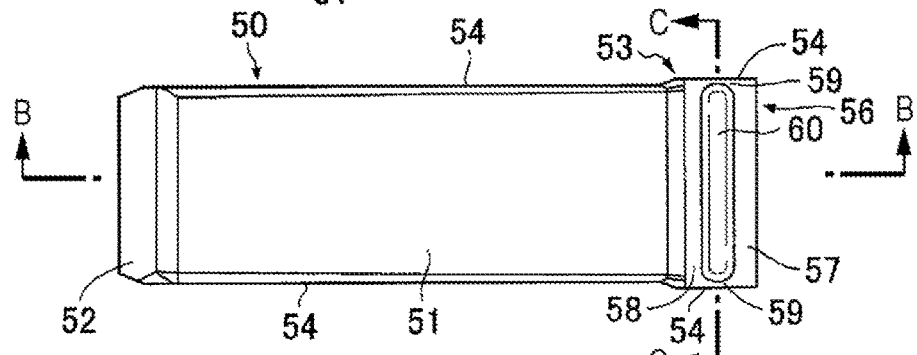
Figure 4C:
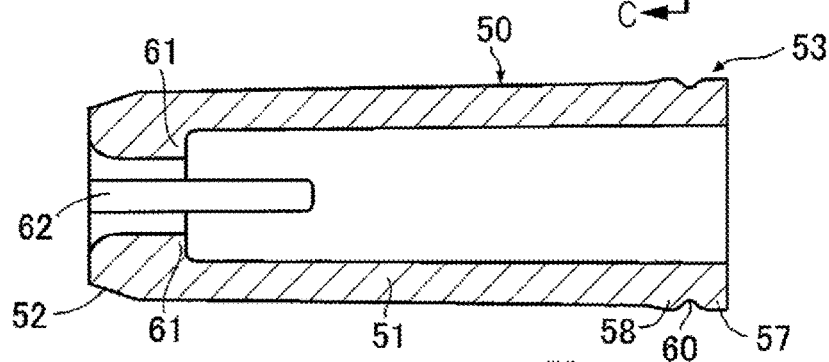
Figure 4D:
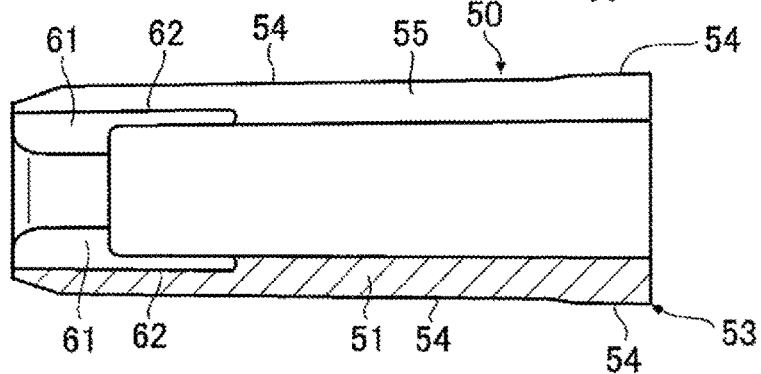

Further, as illustrated in FIGS. 4C and 4D, the outer circumference of the piston 50 has a tapered shape in which the diameter increases from one end toward the other end of the piston 50. In this embodiment, the outer periphery of the main body 51 forming the piston 50 is formed in a tapered shape in which the diameter gradually increases from the other end of the tapered one end portion 52 toward the pressure contact portion 53.

Figure 3A:
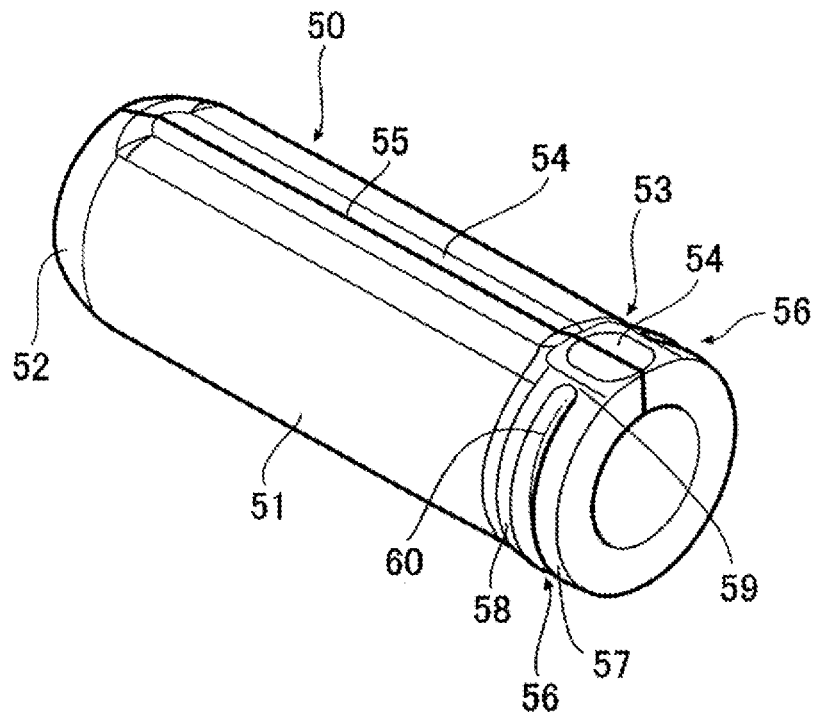
FIGS. 3A and 3B illustrate a piston constituting the damper.
Figure 3B:
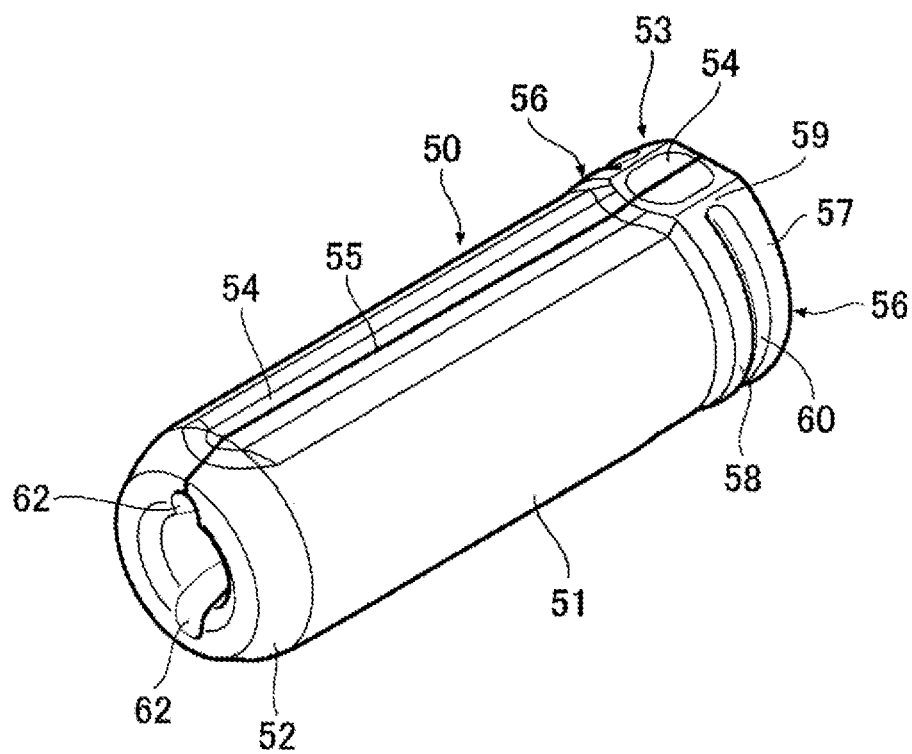
Figure 4E:
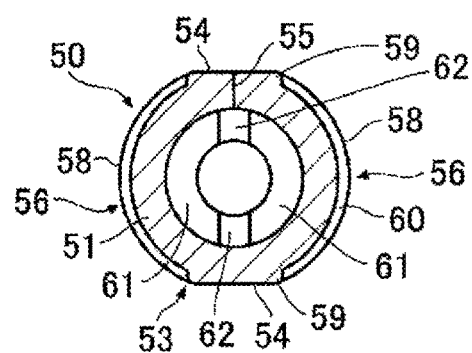

On the outer circumference of the main body 51, a cutout portion 54 extending in the axial direction is formed from the other end of the tapered one end portion 52. The cutout portion 54 forms an escape path for air between the inner circumference of the cylinder and the outer circumference of the piston (the main body 51 and the pressure contact portion 53) to facilitate elastic deformation of the piston 50 and is intended to adjust the damping force of the damper by the piston 50. As illustrated in FIG. 4E, when the piston 50 is viewed from the axial direction, cutout portions 54 have a shape obtained by cutting a part of the circular shape of the outer circumference of the main body 51 with one plane, and are formed at two locations in a circumferential direction of the main body 51 so as to be parallel to each other. Further, as illustrated in FIGS. 3A and 3B, the cutout portion 54 in this embodiment is formed to penetrate the pressure contact portion 53 in the axial direction and reach the other end of the main body 51. By providing such a cutout portion 54, a gap is formed between an outer circumferential portion from the pressure contact portion 53 to one end of the main body 51 and the inner circumference of the cylinder 20 in a state where the damping force of the damper does not act. Further, by forming the cutout portion 54 in the pressure contact portion 53, whether when the rod 30 or the piston 50 is stationary, during damping of the damper, or during release of the damper, the cutout portion 54 of the pressure contact portion 53 is not in close contact with the inner circumference of the cylinder 20, and a gap is formed with the inner circumference of the cylinder 20.

The cutout portion 54 in this embodiment is formed from the other end of the one end portion 52 of the main body 51 to the other end of the main body 51, however, when the one end portion 52 of the main body 51 is not tapered, the cutout portion may be formed from the one end of the main body 51 to the other end. However, the cutout portion may be formed from the one end of the main body 51 to a midpoint in the axial direction, or may be provided only on the pressure contact portion 53 on the other end side of the main body 51 without being formed on the outer circumference of the main body 51.

As illustrated in FIGS. 3A and 3B, the pressure contact portion 53 in this embodiment has a pair of annular protrusions 56, 56 projecting in an outer diameter direction of the main body 51 of the piston 50 and elongated in the circumferential direction of the main body 51. The pair of annular protrusions 56, 56 is respectively arranged on the outer circumference of the other end portion of the main body 51 and between the cutout portions 54, 54 provided at two locations in the circumferential direction of the pressure contact portion 53 (See FIG. 4E). More specifically, each annular protrusion 56 includes a first protrusion 57 disposed on the outer circumference of the other end of the main body 51 and extending in the circumferential direction of the main body 51, a second protrusion 58 disposed on the one end side of the main body 50 in parallel with the first protrusion 57 at a predetermined interval and extending in the circumferential direction of the main body 51, and connecting projections 59, 59 that connect circumferential both end portions of the first protrusion 57 and the second protrusion 58 to each other. Further, inside the protrusions 57, 58, 59, a recess 60 having a recessed groove shape extending at a predetermined depth in the circumferential direction of the main body 51 is provided. Furthermore, the outermost diameter of each of the protrusions 57, 58, 59 is formed larger than an inner diameter of the cylinder 20, so that each of the protrusions 57, 58, 59 is constantly in pressure contact with the inner circumference of the cylinder 20.

As illustrated in FIGS. 4C and 4D, an engaged portion 61 annularly projecting in the circumferential direction is provided on the inner circumference of the one end side of the main body 51. The engaged portion 61 is adapted to engage with the second engaging portion 37 of the rod 30 when the rod 30 moves in the return direction of the damper, as illustrated by the arrow F2 in FIG. 14 (see FIG. 18A). At this time, as illustrated in FIG. 18B, a gap is formed between the first engaging portion 34 of the rod 30 and the one end of the piston 50.

As illustrated in FIGS. 3B, 4C and 4D, recessed groove-shaped air circulation grooves 62, 62 extending in the axial direction from the one end toward the other end of the main body 51 are formed in the inner circumference of the main body 51 at positions corresponding to a pair of the cutout portions 54, 54. As illustrated in FIG. 15, in a state where the second engaging portion 37 of the rod 30 engages with the engaged portion 61 of the piston 50, the air circulation groove 62 extends in a length extending from the one end of the main body 51 to reach the one end of the second pillar 39 over the second engaging portion 37 and the recess 38 of the rod 30. Then, the air circulation groove 62 forms a gap with the first pillar portion 36, the second engaging portion 37, and the outer circumference on the one end side of the second pillar portion 39 of the rod 30, and allows the air to flow between the rod 30 and the piston 50. The air circulation groove only needs to be formed between the outer circumference of the rod 30 and the inner circumference of the piston 50, and may be formed, for example, on the outer circumference side of the rod.

As illustrated in FIGS. 3A, 3B and 4A, in the one cutout portion 54 provided on the outer circumference of the main body 51, a cutout 55 is formed from the one end to the other end of the piston 50 over an entire region in the axial direction of the piston 50. As illustrated in FIGS. 4D and 4E, the cutout 55 communicates with one of a pair of the air circulation grooves 62, 62 formed in the inner circumference of the piston 50. The cutout 55 is configured such that when the piston 50 moves in the damping direction of the damper, the cutout 55 is closed because pressure inside the air circulation groove 62 is reduced (see FIGS. 13A and 13B), while when the piston 50 moves in the return direction of the damper, the cutout 55 is pressed by the air flowing in from the air circulation groove 62 and opened (see FIGS. 5 and 14).

Since the main body 51 can be separated into two in the axial direction by the cutout 55 provided in the main body 51, the piston 50 can be mounted on the piston mounting portion 32 from the outer circumference side of the rod 30. Note that the cutout 55 may not be formed in the entire region in the axial direction from the one end to the other end of the main body 51, but may be formed in a length to reach a midpoint in the axial direction from the one end toward the other end of the main body 51.

Then, in a state where the rod 30 and the piston 50 do not move in the damping direction or the returning direction of the damper and are stationary, that is, in a normal state where the piston 50 does not expand or contract, as illustrated in FIG. 15, a gap is formed between the first engaging portion 34 of the rod 30 and the one end of the piston 50, and a gap is also formed between the stopper portion 35 of the rod 30 and the other end of the piston 50 by the cut portion 35a provided in the stopper portion 35.

The damper 10 having the above structure is configured such that during damping of the damper, the first engaging portion 34 of the rod 30 contacts the one end portion 52 of the piston 50, and an axial compressive force acts on the piston 50 between the first engaging portion 34 and the annular protrusions 56, 56 of the pressure contact portion 53 that is constantly in pressure contact with the inner circumference of the cylinder 20. That is, as illustrated in FIG. 16A, in a state where the damping force is not applied to the damper, the pair of annular protrusions 56, 56 of the piston 50 is in pressure contact with the inner circumference of the cylinder 20 in FIG. 16B. From this state, when the rod 30 moves in the damping direction of the damper, as illustrated in FIG. 17A, the first engaging portion 34 contacts the one end portion 52 of the piston 50 and the axial compressive force acts on the piston 50 between the first engaging portion 34 and the pressure contact portion 53 in pressure contact with the inner circumference of the cylinder 20, so that the piston 50 increases in diameter and an amount of pressure contact with the inner circumference of the cylinder increases. As a result, as illustrated in FIG. 17B, it is possible to increase a portion S (means a portion shown by hatching with dots. The same applies to the following description, and also simply referred to as a "cylinder pressure contact portion S") of the piston 50 that is in pressure contact with the inner circumference of the cylinder 20 to increase frictional force of the piston 50 against the inner circumference of the cylinder 20, thereby increasing the damping force of the damper.

The damper 10 in this embodiment is provided with, as a passage for passing the air to the piston 50 in the cylinder 20, (1) a gap between the flat surface 40 of the first engaging portion 34 of the rod 30 and the inner circumference of the cylinder 20, (2) a gap between the first engaging portion 34 of the rod 30 and the one end of the piston 50, (3) a gap between the groove 43 of the rod 30 and the inner circumference of the piston 50, (4) a gap between the outer circumference of the rod 30 and the air circulation groove 62 of the piston 50, (5) a gap between the recess 38 of the rod 30 and the inner circumference of the piston 50, (6) a gap between the second pillar portion 39 of the rod 30 and the inner circumference of the piston 50 by the protrusion 41, (7) a gap between the cut portion 35a of the stopper portion 35 of the rod 30 and the other end of the piston 50, and (8) a gap between the flat surface 40 of the stopper portion 35 of the rod 30 and the inner circumference of the cylinder 20.

Then, as illustrated in FIG. 15, when the rod 30 is stationary and the damping force of the damper is not given, the gaps (1) to (8) are secured. Further, as illustrated in FIGS. 17A and 17B, when the rod 30 moves in the damping direction of the damper, since the first engaging portion 34 of the rod 30 contacts the one end of the piston 50, the gap (2) is eliminated, but the gaps (1) and (3) to (8) are secured. Furthermore, as illustrated in FIGS. 18A and 18B, when the rod 30 moves in the return direction of the damper, since the first engaging portion 34 of the rod 30 again separates from the one end of the piston 50, the gaps (1) to (8) are secured.

When the damper 10 is switched from a state in which the damper is damped to a state in which the damping force of the damper is released, that is, as illustrated in FIGS. 17A and 17B, when the rod 30 moves in the returning direction of the damper from a state in which the axial compressive force acts on the piston 50 so that the piston 50 increases in diameter and the frictional force against the inner circumference of the cylinder 20 increases, the damper 10 is configured such that the piston 50 can be easily returned to a predetermined position by performing the following operation. That is, as illustrated in FIGS. 18A and 18B, when the rod 30 moves in the return direction of the damper from a state illustrated in FIGS. 17A and 17B, the second engaging portion 37 of the rod 30 engages with the engaged portion 61 of the piston 50, an axial tensile force acts on the piston 50, and the one end of the piston 50 is extended with respect to the other end which is restricted from moving by the pressure contact portion 53, so that the piston 50 can be reduced in diameter into the original shape (see FIGS. 19A and 19B). As a result, the frictional force of the piston 50 against the inner circumference of the cylinder 20 is reduced, so that the piston 50 can be easily returned to the original shape.

Next, the cap 80 attached to the opening 22 of the cylinder 20 will be described with reference to FIGS. 6A to 12.

As illustrated in FIGS. 1 and 12, the cap 80 has a shape that can be assembled to the rod 30 from an outside in the radial direction of the rod 30 and can be inserted into the opening 22 of the cylinder 20, and there is provided a fitting portion that fits when the cap 80 is inserted into the opening 22 of the cylinder 20 between the cylinder 20 and the cap 80.

Figure 6A:
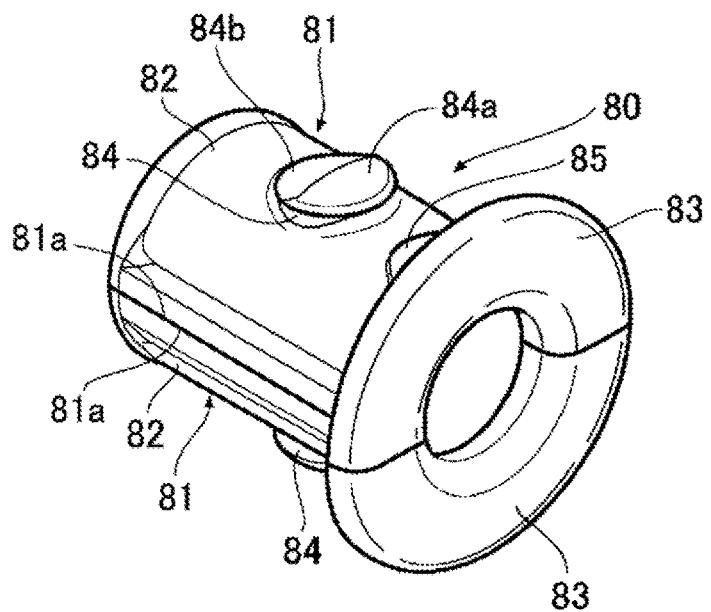
FIGS. 6A and 6B illustrate a cap constituting the damper.
Figure 6B:
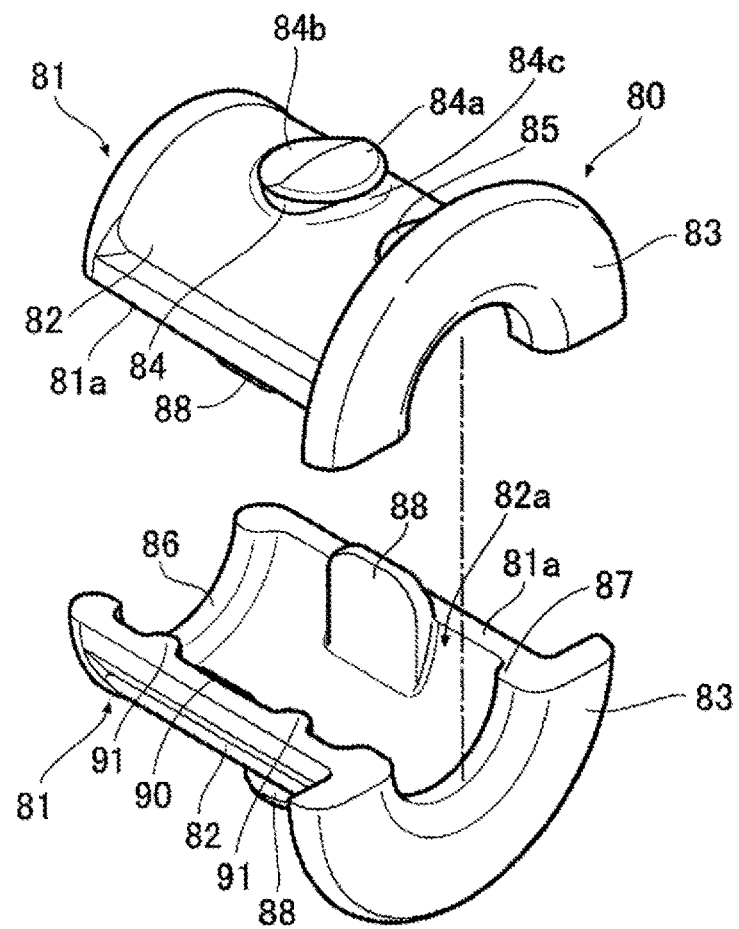

More specifically, as illustrated in FIGS. 6A and 6B, the cap 80 in this embodiment has a pair of half-split members 81, 81 having a half-split cylindrical shape, and is configured to have a substantially cylindrical shape when assembled and integrated with each other by a locking unit. The pair of half-split members 81, 81 has the same shape, including any of a fitting protrusion 84, an insertion stopper portion 85, a locking piece 88, a protrusion 90 and the like, which will be described below.

Each half-split member 81 has a half-split cylindrical main body 82 extending in the axial direction of the rod 30, and the main body 82 is formed with a receiving opening 82a that can receive the rod 30 from the outside in the radial direction. The main body 82 in this embodiment is adapted to be inserted into the cylinder 20 through the opening 22 of the cylinder 20. A flange 83 having a semicircular plate shape is provided on the base end side of the main body 82. Then, the pair of half-split members 81, 81 will have a substantially cylindrical shape having a disc-shaped flange on the base end side as illustrated in FIGS. 6A, 6B and 8A, by aligning orientations of flanges 83 and bringing mating surfaces 81a (hereinafter, also simply referred to as "mating surfaces 81a") at both ends in the circumferential direction into contact with each other.

As illustrated in FIG. 9B, an inner surface 83a (an insertion side surface into the cylinder 20) of the flange 83 contacts an axial base end surface of the cylinder 20 when the cap 80 is inserted into the cylinder 20, and as illustrated by the arrow F2 in FIG. 14, when the rod 30 moves in the returning direction of the damper, the inner surface 83a contacts the base end surface of the cylinder 20 with a stronger contact force.

A "tip" in the description of the cap means an end on an insertion direction side when the cap is inserted into the opening of the cylinder, and a "base end" means an end opposite to the insertion direction of the cap into the opening of the cylinder.

Figure 8A:
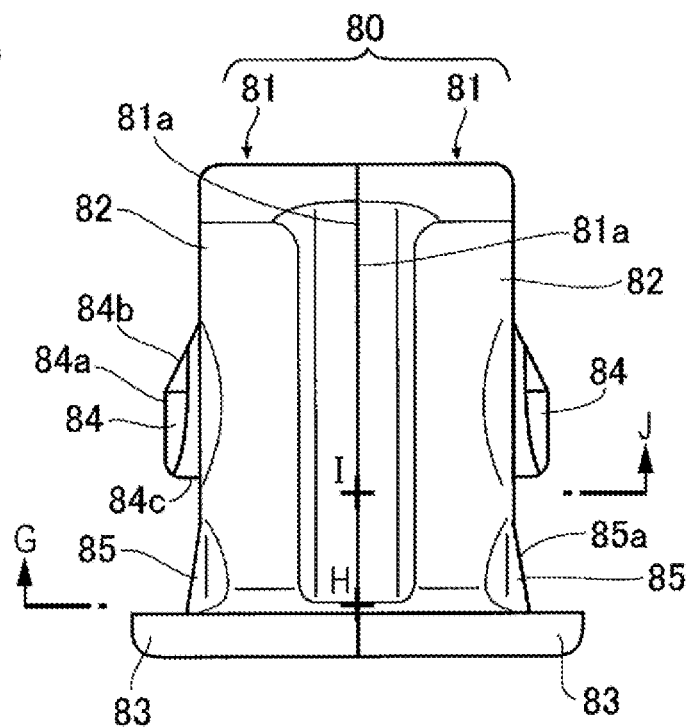
FIG. 8A is a plan view of the cap.

As illustrated in FIGS. 6A, 6B and 8A, the fitting protrusion 84 is provided projecting at a substantially center in a circumferential direction and a substantially center in an axial direction of the main body 82. An outer surface 84a of the fitting protrusion 84 is substantially flat, and a tip surface 84b of the fitting projection 84 is tapered so that a protrusion height gradually decreases toward a tip of the cap. Further, an engagement surface 84c that is a surface perpendicular to the axial direction of the main body 82 is provided on a base end side of the fitting protrusion 84.

Then, as illustrated in FIG. 9B, when the cap 80 is inserted into the cylinder 20, the engagement surface 84c of the fitting protrusion 84 engages with the inner circumference of the fitting hole 25 of the cylinder 20 at the base end side, so that the cap 80 fits into the opening 22 of the cylinder 20, to be attached in a state where it is prevented from slipping off. That is, the fitting protrusion 84 of the cap 80 and the fitting hole 25 of the cylinder 20 constitute the "fitting portion" of the present invention. As illustrated by the arrow F1 in FIGS. 13A and 13B, when the rod 30 moves in the damping direction of the damper, the engagement surface 84c of the fitting protrusion 84 engages with the inner circumference of the fitting hole 25 with a stronger engaging force (see FIG. 10).

Figure 9A:
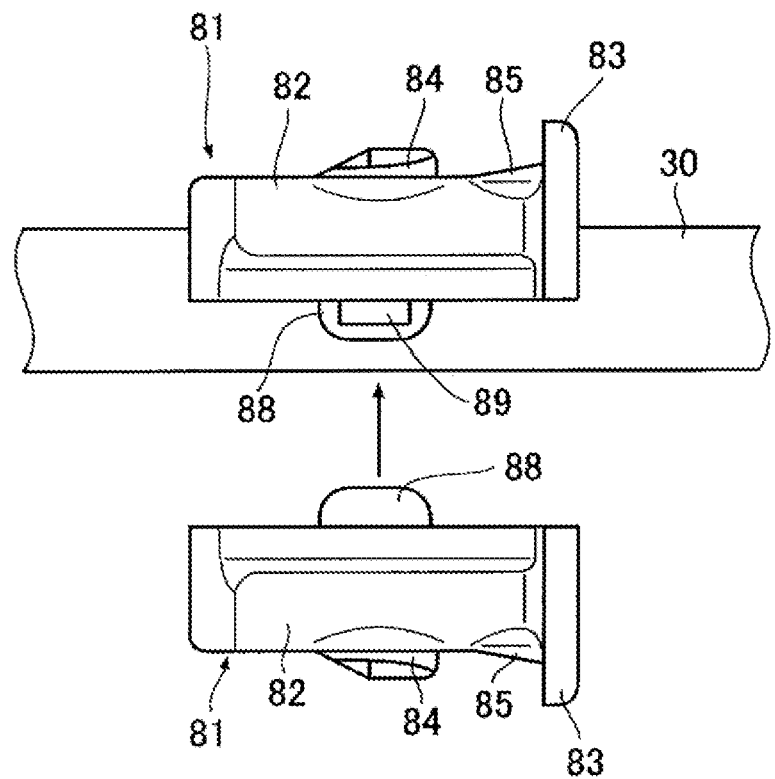
FIG. 9A is an explanatory view when the cap is assembled to the rod.
Figure 9B:
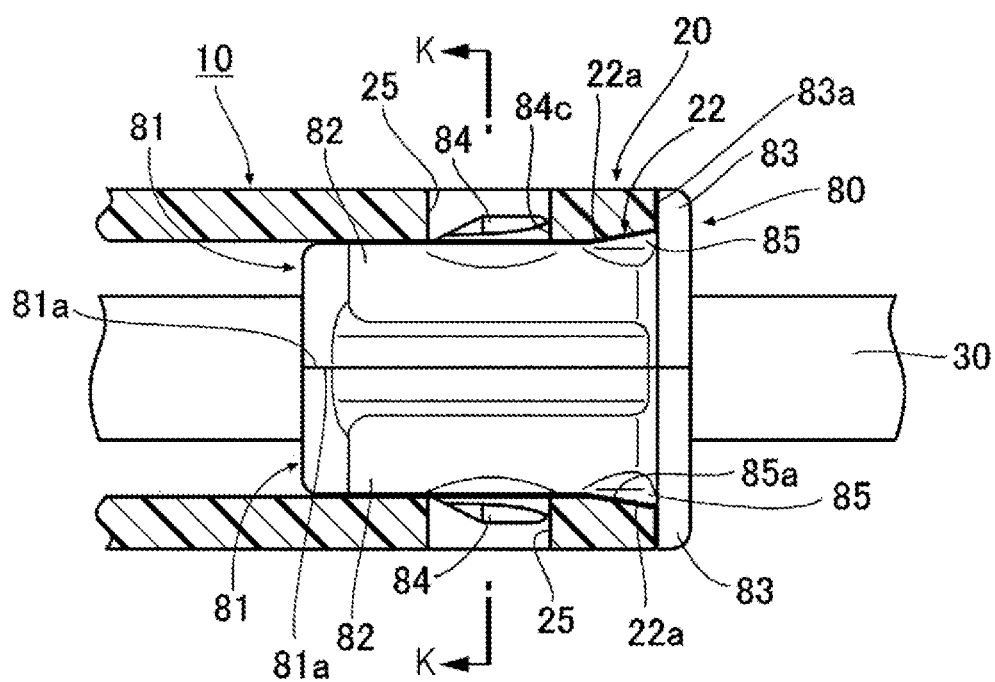
FIG. 9B is an explanatory view of a state in which the cap is attached to an opening of a cylinder.

As illustrated in FIGS. 9A and 9B, the insertion stopper portion 85 projecting toward the flange 83 so that its height gradually increases is provided at a circumferential position aligned with the fitting protrusion 84 and on a base end side outer circumference of the main body 82. An outer surface 85a of the insertion stopper portion 85 is substantially flat like the outer surface 84a of the fitting protrusion 84. When the cap is inserted into the cylinder 20, the outer surface 85a of the insertion stopper portion 85 contacts the stopper receiving surface 22a provided in the opening 22 of the cylinder 20, so that the cap 80 is restricted from being inserted into the cylinder 20, and the cap 80 is restricted from rotating with respect to the cylinder 20.

Figure 7A:
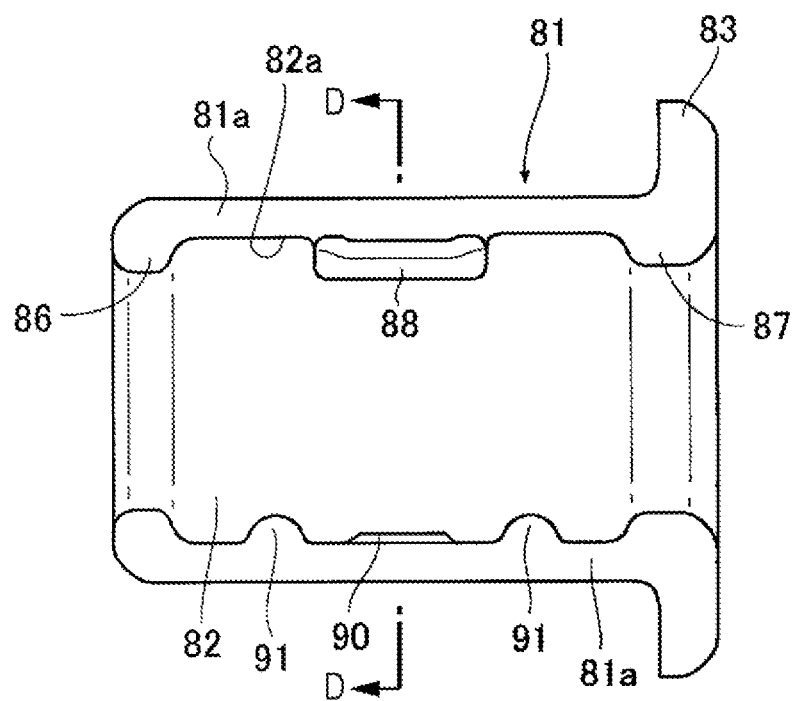
FIG. 7A is a front view of the cap.
Figure 8B:
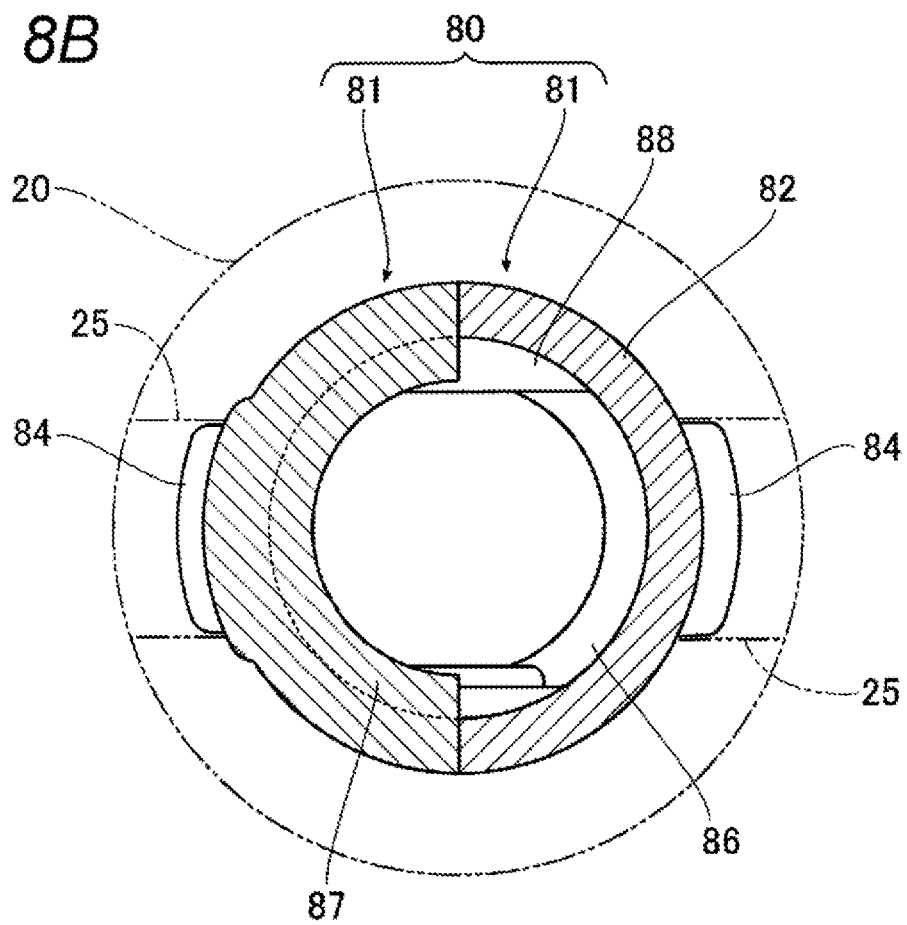
FIG. 8B is a cross-sectional view taken along a line G-H-I-J of FIG. 8A.

As illustrated in FIGS. 6B and 7A, protrusions 86 and 87 extending in the circumferential direction of the main body 82 and projecting from an inner circumference of the main body 82 are respectively provided on the inner circumference on an axial tip side and on the inner circumference on an axial base end side of the main body 82. As illustrated in FIG. 8B, the fitting portion (here, the fitting protrusion 84 of the cap 80 and the fitting hole 25 of the cylinder 20) between the cylinder 20 and the cap 80 is provided to overlap a pair of the protrusions 86 and 87 in the circumferential direction of the cap 80 when the cap 80 is viewed in the axial direction.

Figure 7B:
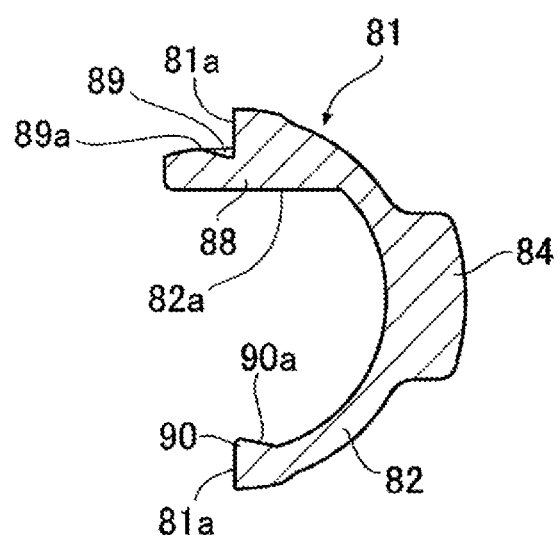
FIG. 7B is a cross-sectional view taken along a line D-D of FIG. 7A.

As illustrated in FIGS. 6B, 7A and 7B, a tongue-shaped locking piece 88 extends from a position, that is near one mating surface 81a and a substantially central position in the axial direction, in the inner circumference of the main body 82 constituting each half-split member 81, and projects from the mating surface 81a of the half-split member 81 by a predetermined length. Further, as illustrated in FIGS. 7B and 9A, a recess 89 having a predetermined depth is formed on an outer surface of a portion of the locking piece 88 projecting from the mating surface 81a. An inner surface of the recess 89 on a tip side in an extending direction of the locking piece 88 forms a tapered surface 89a gradually rising toward the tip. An inner surface of the locking piece 88 is flat (see FIG. 7B).

On the other hand, as illustrated in FIGS. 7A and 7B, the protrusion 90 projecting inward of the main body 82 and locked in the recess 89 of the locking piece 88 of the other half-split member 81 is provided projecting at an axial position that is a peripheral edge of the other mating surface 81a of the inner circumference of the main body 82 constituting each half-split member 81 and is aligned with the locking piece 88. An inner surface of the protrusion 90 forms a tapered surface 90a gradually lowering inwardly of the main body 82 (see FIG. 7B). An outer surface (surface on the mating surface 81a side) of the protrusion 90 has a flat surface shape flush with the mating surface 81a. A pair of guide ribs 91, 91 is provided projecting on both sides of the protrusion 90 on the inner circumference of the main body 82 at an interval wider than a width of the locking piece 88. The pair of guide ribs 91, 91 forms a guide for making it easier to insert the locking piece 88 between the guide ribs 91, 91 when the protrusion 90 and the recess 89 of the locking piece 88 are locked to each other.

As illustrated in FIG. 9A, one half-split member 81 is pressed from the outside in the radial direction of the shaft portion 31 of the rod 30 and is disposed on the outer circumference of the rod 30 through the receiving opening 82a. In that state, the other half-split member 81 is disposed in a direction aligned with the flange 83 of the one half-split member 81, and is pressed from the outside in the radial direction of the shaft portion 31 of the rod 30 through the receiving opening 82a (see FIG. 9A). Then, as illustrated in FIG. 11A, the protrusion 90 of the other half-split member 81 enters and locks in the recess 89 from the outer surface side of the locking piece 88 of the one half-split member 81, and the protrusion 90 of the one half-split member 81 enters and locks in the recess 89 from the outer surface side of the locking piece 88 of the other split member 81, and thus, as illustrated in FIG. 9B, the pair of half-split members 81, 81 can be assembled to the outer circumference of the rod 30 in a state of being integrated into a substantially cylindrical shape.

That is, in this embodiment, the recess 89 of the locking piece 88 and the protrusion 90 locking the recess 89 form the "locking unit" in the present invention. In this embodiment, the mating surfaces 81a, 81a of the pair of half-split members 81, 81 contact each other, and the cap 80 is assembled with no gap between the pair of half-split members 81, 81 (see FIG. 9B). As the locking unit, for example, locking claws for locking each other may be provided on both of the pair of half-split members, or a locking claw may be provided on the one half-split member and a locking hole or the like for locking the locking claw may be provided on the other half-split member, and there is no particular limitation.

The cap 80 assembled as described above is attached to the opening 22 of the cylinder 20 by the rod 30 being inserted into the cylinder 20 and pushed in until the flanges 83, 83 of the cap 80 contact the base end surface of the cylinder 20, and as illustrated in FIG. 9B, by fitting protrusions 84, 84 of the cap 80 being respectively fitted into fitting holes 25, 25 of the cylinder 20.

Figure 10:
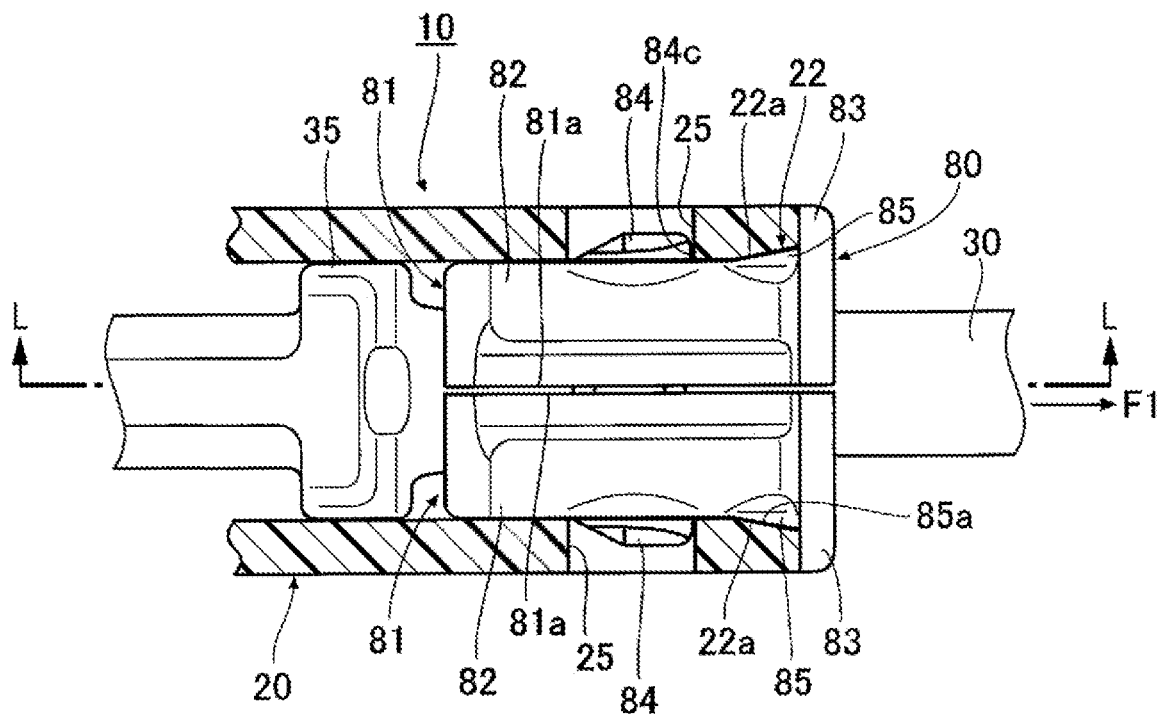
FIG. 10 is an explanatory view of a state in which the rod moves in the damping direction of the damper from the state of FIG. 9B.

In this state, as illustrated in FIG. 10, when the rod 30 moves in the damping direction of the damper and the rod 30 is maximally pulled out from the opening 22 of the cylinder 20, as illustrated in FIG. 12, the inclined portion 44 provided on the tip side outer circumference of the shaft portion 31 of the rod 30 is pressed from the inner surface side by the protrusion 86 provided on a tip side inner circumference of the cap 80. At this time, as illustrated in FIG. 11B, the protrusion 90 slides on the tapered surface 89a of the recess 89 of each locking piece 88 through the tapered surface 90a and moves in a direction of slipping out of the recess 89, and thus, as illustrated in FIG. 10, the pair of half-split members 81, 81 increases in diameter so that the mating surfaces 81a, 81a are separated from each other.

That is, in this embodiment, the locking unit (here, the recess 89 and the protrusion 90 of the locking piece 88) further has a structure of locking the pair of half-split members 81, 81 so that they can be separated by a predetermined distance, and has a structure in which when the rod 30 is maximally pulled out from the cylinder 20, the rod 30 contacts the inner circumference of the cap 80 and the cap 80 increases in diameter. In this manner, when the rod 30 is pushed into the cylinder 20, the mating surfaces 81a, 81a of the pair of half-split members 81, 81 contact each other, and the cap 80 is held in a state of being reduced in diameter (see FIG. 9A). On the other hand, when the rod 30 is maximally pulled out from the cylinder 20, the mating surfaces 81a, 81a of the pair of half-split members 81, 81 are separated from each other and the cap 80 is in a state of increasing in diameter (see FIG. 10).

The cap 80 described above has the main body 82 that is inserted into the opening portion 22 of the cylinder 20, but is not limited to this aspect as the cap, and the cap 80 only needs to have a structure which has a main body extending in the axial direction of the rod 30 and in which the receiving opening allowing the rod 30 to be received from the outside in the radial direction is formed in the main body.

Next, the operation and effect of the damper 10 having the above structure will be described.

That is, when assembling the cap 80 between the engaging portion and the mounting portion 33 of the rod 30, here, on the outer circumference of the shaft portion 31 of the rod 30, as illustrated in FIG. 9A, after the one half-split member 81 is disposed from the outside in the radial direction of the rod 30 through the receiving opening 82a, the other half-split member 81 is disposed in alignment with the one half-split member 81 and pushed in from the outside in the radial direction of the rod 30 through the receiving opening 82a, so that mating protrusions 90 are respectively locked in the recesses 89 of the locking pieces 88, and thus, as illustrated in FIG. 9B, the cap 80 can be securely assembled to the outer circumference of the rod 30.

As described above, since the cap 80 in this embodiment has a shape that can be assembled from the outside in the radial direction of the rod 30 through the receiving opening 82a, there is no need to provide the cap 80 with a hole through which the first engaging portion 34, the stopper portion 35, the second engaging portion 37, the mounting portion 33 of the rod 30 can pass, so that the cap 80 can be reduced in diameter and the outer diameter of the cylinder 20 can be reduced. Further, since there is no need to reduce a size of the mounting portion 33 of the rod 30, the rod 30 can be connected to the other of the pair of members that approach or separate from each other with sufficient strength.

Since the cap 80 in this embodiment includes the pair of half-split members 81, 81 having a half-split cylindrical shape, and has the locking unit (here, the recess 89 of the locking piece 88 and the protrusion 90) capable of locking each other when assembled into a cylindrical shape, when the cap 80 is assembled to the rod 30 as described above, the cap 80 can be assembled to the rod 30 by a simple operation of respectively arranging the half-split members 81, 81 on the outside in the radial direction of the rod 30 and locking the half-split members 81, 81 to each other by the locking unit, thereby workability of assembling the cap 80 to the rod 30 is improved.

Then, the rod 30 with the cap 80 assembled is inserted into the opening 22 of the cylinder 20 from the tip side of the rod 30, and the rod 30 is pushed into the cylinder 20 by a predetermined amount. Thereafter, insertion stopper portions 85, 85 of the cap 80 are aligned with the stopper receiving surfaces 22a, 22a of the cylinder 20, and by sliding the cap 80 on the outer circumference of the rod 30 in that state, the cap 80 is pushed into the opening 22 of the cylinder 20 until the flanges 83, 83 contact the base end surface of the cylinder 20. Then, as illustrated in FIG. 9B, main bodies 82, 82 of the pair of half-split members 81, 81 are inserted into the opening 22 of the cylinder 20, and the fitting protrusions 84, 84 of the cap 80 are respectively fitted into the fitting holes 25, 25 of the cylinder 20, so that the cap 80 can be attached to the opening 22 of the cylinder 20.

In this embodiment, as described above, since the cap 80 includes the pair of half-split members 81, 81, and the half-split members are integrated by the locking unit, the cap 80 is inserted into the opening 22 of the cylinder 20 in a state where the pair of half-split members 81, 81 surrounds an entire outer circumference of the rod 30, and thus it is possible to prevent dust and the like from entering the cylinder 20 through the opening 22 of the cylinder 20.

As described above, the locking unit (here, the recess 89 and the protrusion 90 of the locking piece 88) in this embodiment has the structure of locking the pair of half-split members 81, 81 so that they can be separated by a predetermined distance as illustrated in FIG. 11B, and has the structure in which when the rod 30 is maximally pulled out from the cylinder 20, the rod 30 contacts the inner circumference of the cap 80 and the cap 80 increases in diameter as illustrated in FIG. 10. Therefore, when the rod 30 is maximally pulled out from the opening 22 of the cylinder 20 and the pair of half-split members 81, 81 increases in diameter, since fitting force of the half-split member 81 to the inner circumference of the cylinder 20 is increased, it is possible to more effectively prevent the cap 80 from slipping out of the opening 22 of the cylinder 20 or from being displaced.

In this embodiment, as illustrated in FIGS. 6B and 7A, the protrusions 86 and 87 extending in the circumferential direction are respectively provided on the inner circumference of both axial ends of the main body 82, and as illustrated in FIG. 8B, when the cap 80 is viewed in the axial direction, the fitting portion is provided to overlap the pair of protrusions 86 and 87 in the circumferential direction of the cap 80. Thus, as illustrated in FIG. 12, when the rod 30 moves inside the cylinder 20 and the protrusion 86 on the tip side inner circumference of the cap 80 is pressed by the outer circumference of the rod 30 and increases in diameter, it is possible to prevent the base end side of the cap 80 from being reduced in diameter by the protrusion 87 on the inner circumference on the base end side of the cap 80 contacting the outer circumference of the rod 30, thereby more reliably preventing the cap 80 from slipping out of the opening 22 of the cylinder 20.

In the damper 10, the other member such as the opening/closing body is opened to the one member such as the instrument panel, and as illustrated by the arrow F1 in FIGS. 13A and 13B, when the rod 30 moves in the damping direction of the damper, the first engaging portion 34 contacts the one end portion 52 of the piston 50, the axial compressive force acts on the piston 50 between the first engaging portion 34 and the pressure contact portion 53, the piston 50 increases in diameter and the amount of pressure contact with the inner circumference of the cylinder 20 increases, so that the portion S of the piston 50 that is in pressure contact with the inner circumference of the cylinder 20 can be increased (see FIG. 17B), the damping force of the damper can be increased, and it is possible to obtain the damper 10 having excellent load response characteristics in which the damping force changes depending on a moving speed of the rod 30.

On the other hand, from a state in which the rod 30 moves in the damping direction, and the piston 50 is compressed and the amount of pressure contact with the inner circumference of the cylinder increases (see FIGS. 17A and 17B), when the member such as the opening/closing body is closed to the member such as the instrument panel, and as illustrated by the arrow F2 in FIG. 14, the rod 30 moves in the return direction of the damper, the second engaging portion 37 on the return direction side of the damper with respect to the pressure contact portion 53 of the piston 50 engages with the engaged portion 61 of the piston 50 to move the piston 50, the axial tensile force acts on the piston 50, and the piston 50 made of the elastic resin material is stretched in the axial direction, and thus, as illustrated in FIGS. 19A and 19B, it is possible to quickly reduce the diameter of the piston 50 to the original shape, and to reduce the frictional force against the inner circumference of the cylinder, so that the piston 50 can be easily returned to the original shape.

Figure 5:
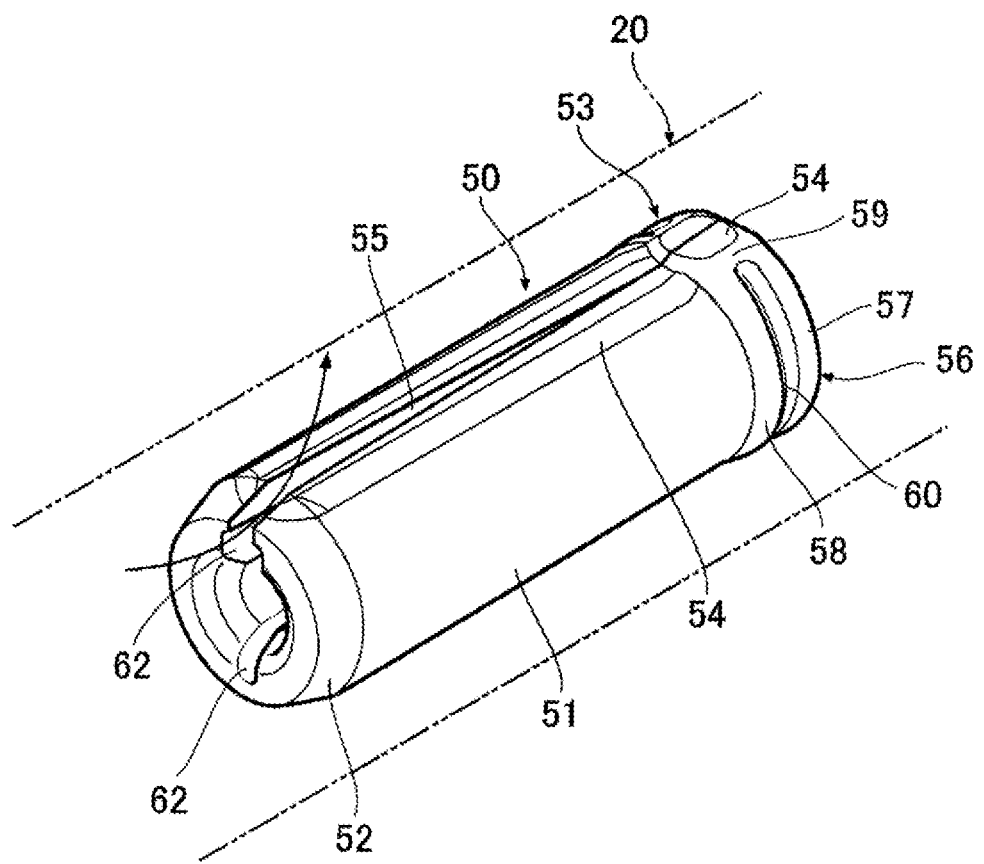
FIG. 5 is a perspective view illustrating a state of the piston constituting the damper when the rod moves in a return direction opposite to a damping direction.

When the rod 30 moves in the return direction of the damper, the first engaging portion 34 of the rod 30 separates from the one end of the piston 50 so that, as illustrated by arrows in FIG. 15, the air in the first chamber R1 passes through the gap (1) between the flat surface 40 of the first engaging portion 34 of the rod 30 and the inner circumference of the cylinder 20, and flows from the gap (2) between the first engaging portion 34 of the rod 30 and the one end of the piston 50 into the gap between the outer circumference of the rod 30 and the air circulation groove 62 of the piston 50, and as illustrated in FIGS. 5, 8A and 8B, the cutout 55 in a closed state is pushed and opened by air pressure, and thus it is possible to discharge the air between the outer circumference of the rod 30 and the inner circumference of the piston 50 to the other end of the piston 50, to discharge the air to the outside of the piston mounting portion 32 of the rod 30 through the gap (7) between the cut portion 35a of the stopper portion 35 of the rod 30 and the other end of the piston 50 and the gap (8) between the flat surface 40 of the stopper portion 35 of the rod 30 and the inner circumference of the cylinder 20 (see FIG. 15), and to easily release the damping force of the damper, so that the piston 50 can be easily returned to the original shape.

FIGS. 20A to 22 illustrate a second embodiment of the damper according to the present invention. Note that substantially the same parts as those in the above embodiment are denoted by the same reference numerals and description thereof will be omitted.

Figure 20A:
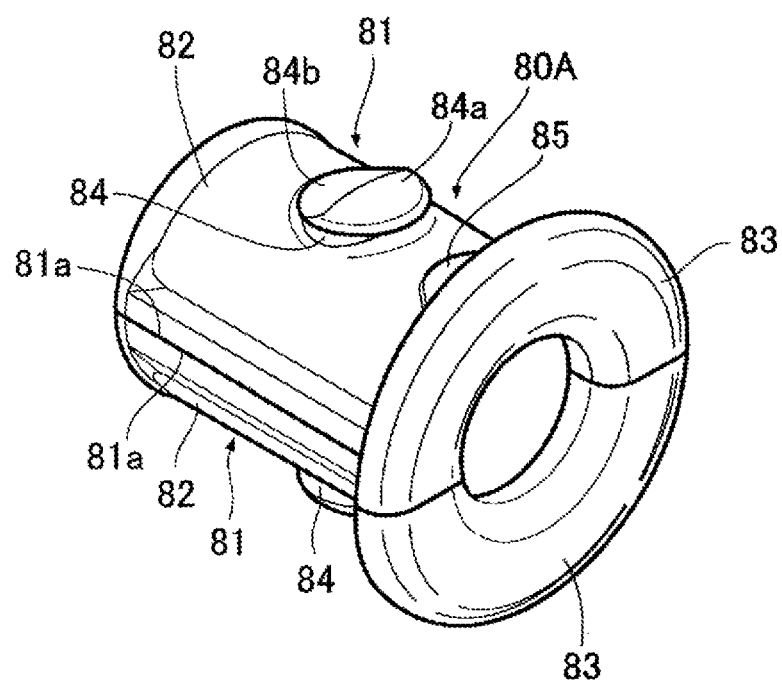
FIGS. 20A and 20B illustrate a second embodiment of the damper according to the present invention.
Figure 20B:
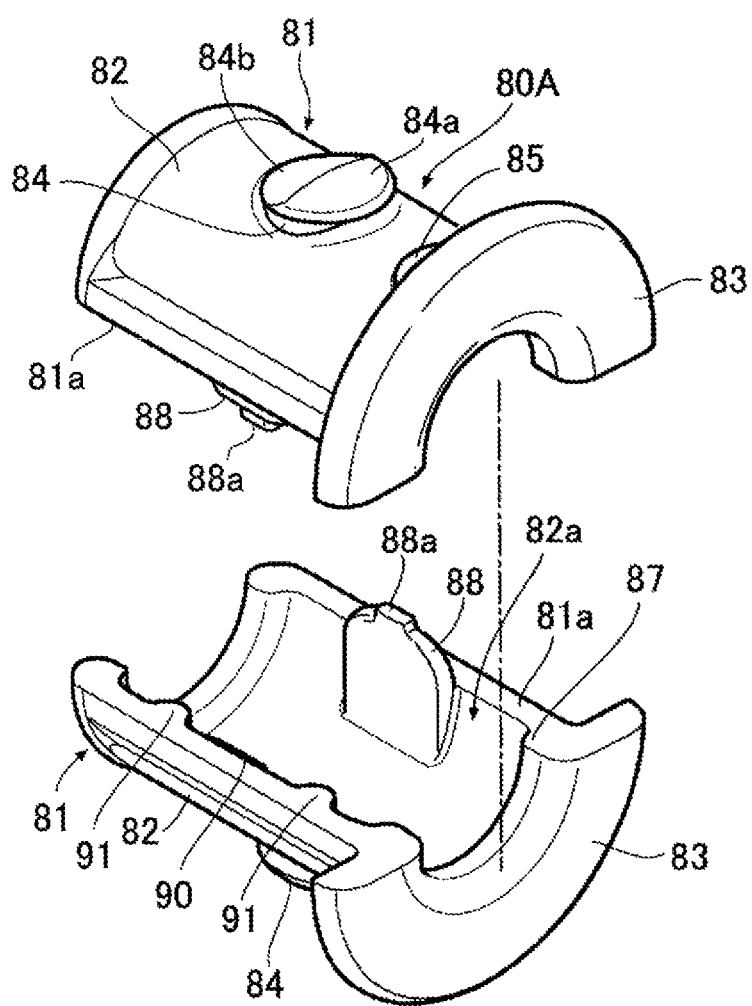
Figure 22:
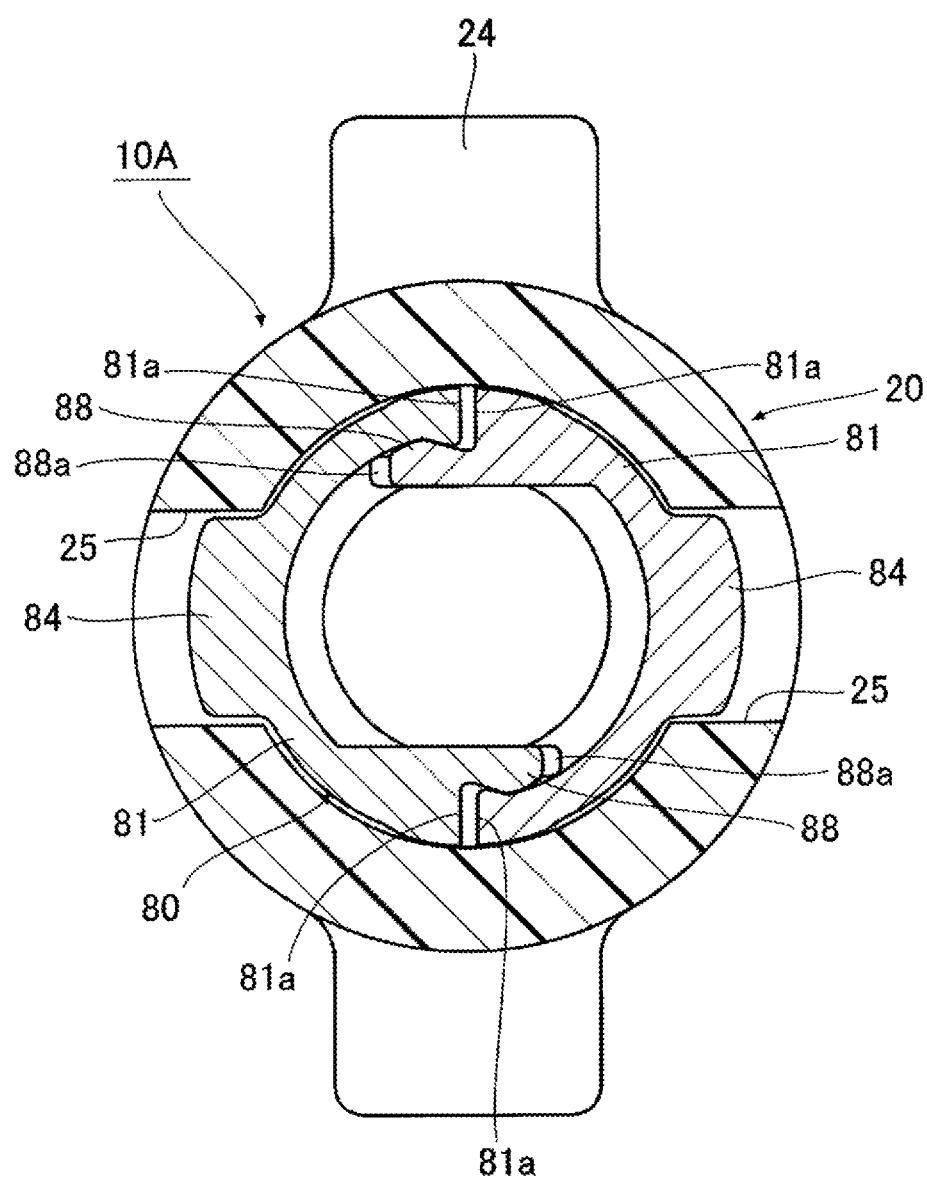
FIG. 22 is a vertical cross-sectional view of a state of FIGS. 21A and 21B.

A damper 10A of this embodiment is different from the above embodiment in a structure of the cap. As illustrated in FIGS. 20B and 22, a cap 80A in this embodiment basically has the same structure as the cap 80 of the first embodiment, however, a protrusion 88a is provided projecting from a tip of the locking piece 88 provided in each half-split member 81. Then, the pair of half-split members 81, 81 is arranged from the outside in the radial direction of the rod 30 through the receiving opening 82a, and the mating protrusions 90 respectively enter the recesses 89 of the locking pieces 88 to be locked to each other, while as illustrated in FIG. 22, the protrusions 88a provided at the tips of the locking pieces 88 respectively contact the inner circumferences of the mating half-split members 81, the mating surfaces 81a, 81a of the pair of half-split members 81, 81 are separated from each other, and the cap 80A is assembled to the rod 30 with the diameter increased.

Figure 21A:
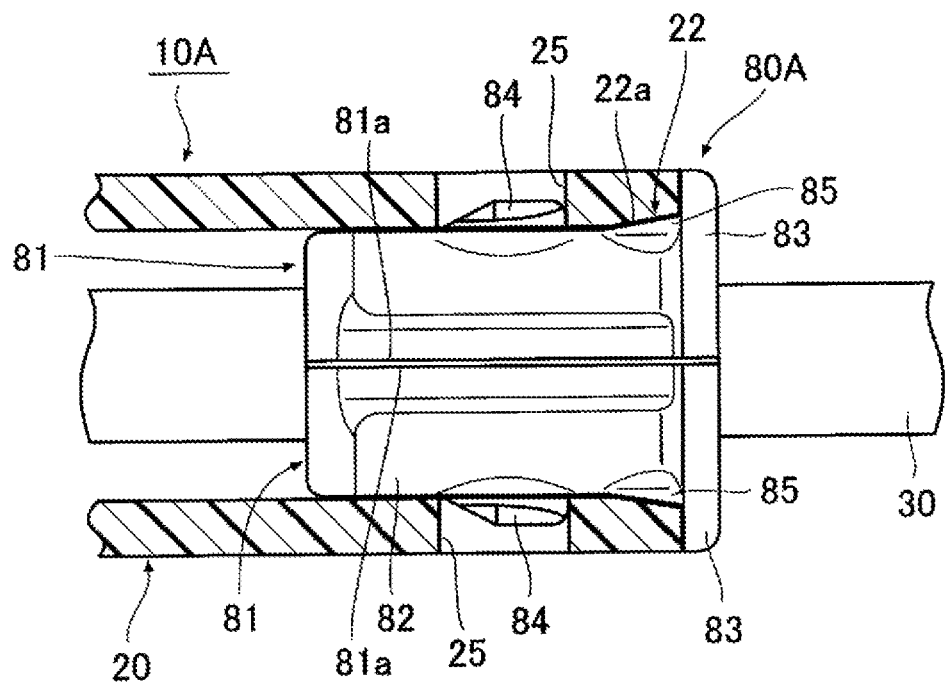
FIG. 21A is an explanatory view of a state in which the cap is attached to the opening of the cylinder.
Figure 21B:
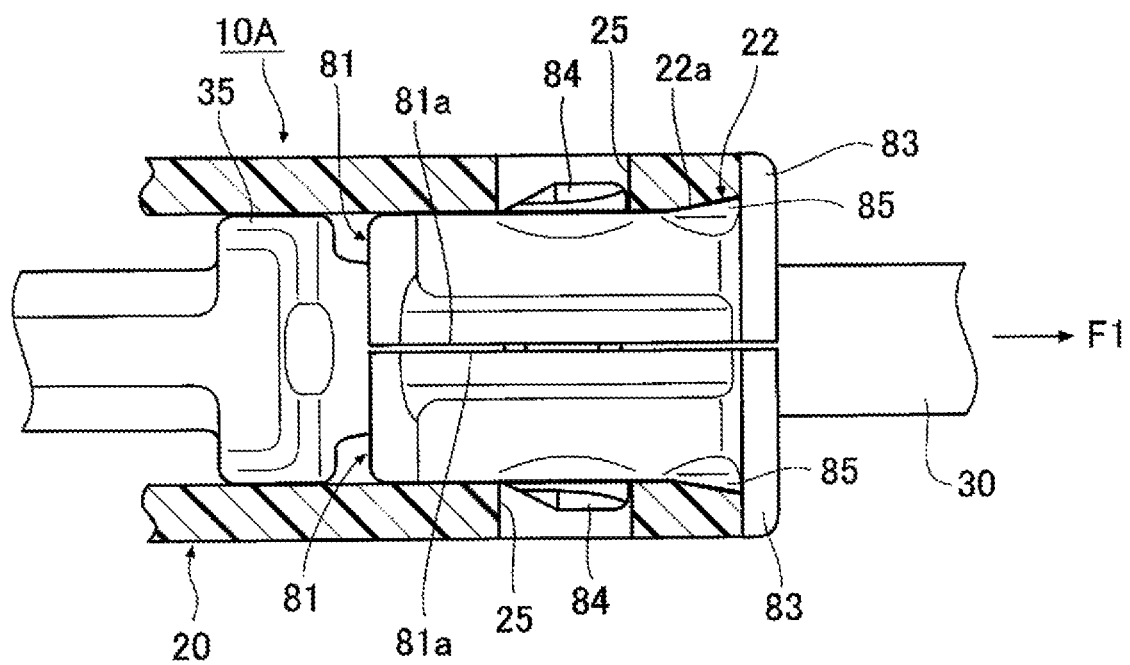
FIG. 21B is an explanatory view of a state in which the rod moves in the damping direction of the damper from the state of FIG. 21A.

That is, in this embodiment, whether when the rod 30 is pushed into the cylinder 20 as illustrated in FIG. 21A, or when the rod 30 is maximally pulled out from the cylinder 20 as illustrated in FIG. 21B, the cap 80 increases in diameter, to be reliably prevented from slipping out of the opening 22 of the cylinder 20.

FIGS. 23A to 25 illustrate a third embodiment of the damper according to the present invention. Note that substantially the same parts as those in the above embodiments are denoted by the same reference numerals and description thereof will be omitted.

Figure 23A:
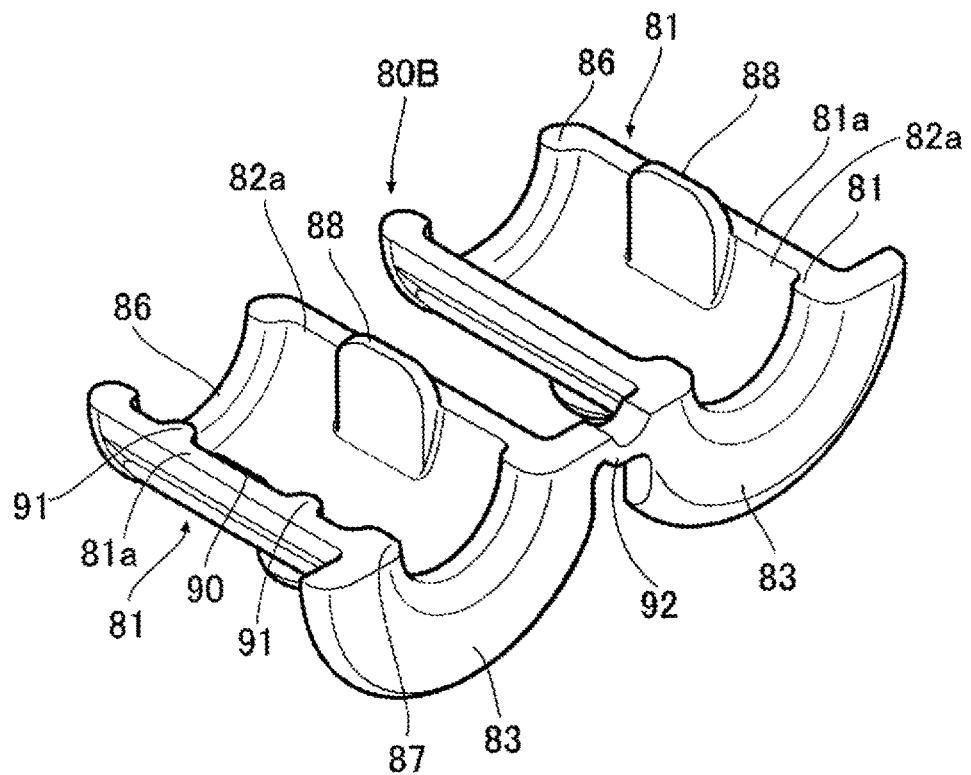
FIGS. 23A and 23B illustrate a third embodiment of the damper according to the present invention.
Figure 23B:
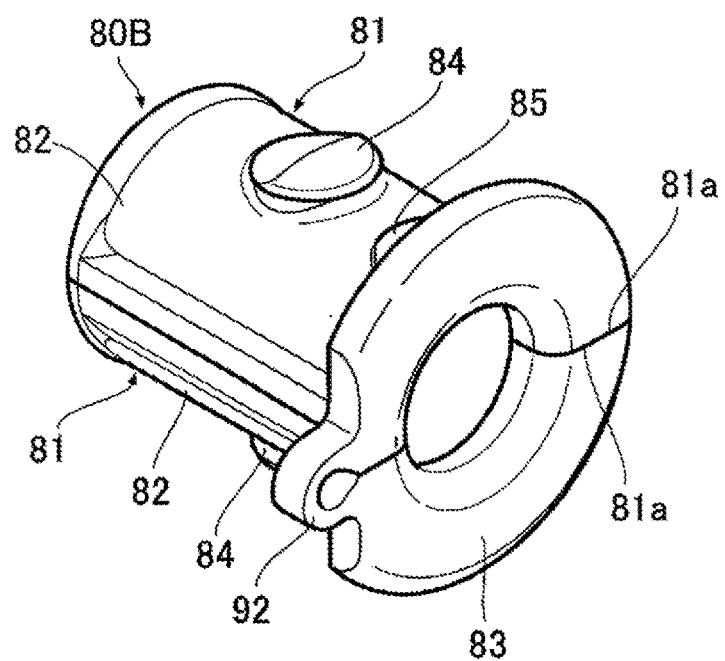

A damper 10B of this embodiment is different from the above embodiments in the structure of the cap. As illustrated in FIGS. 23A and 23B, in a cap 80B in this embodiment, semicircular plate-shaped flanges 83, 83 of the pair of half-split members 81, 81 are connected to each other through a thin-walled plate-shaped hinge portion 92, and the pair of half-split members 81, 81 can be opened and closed. That is, the pair of half-split members 81, 81 has a structure in which they are integrated by the hinge portion 92 even before being assembled to the rod 30.

Figure 24A:
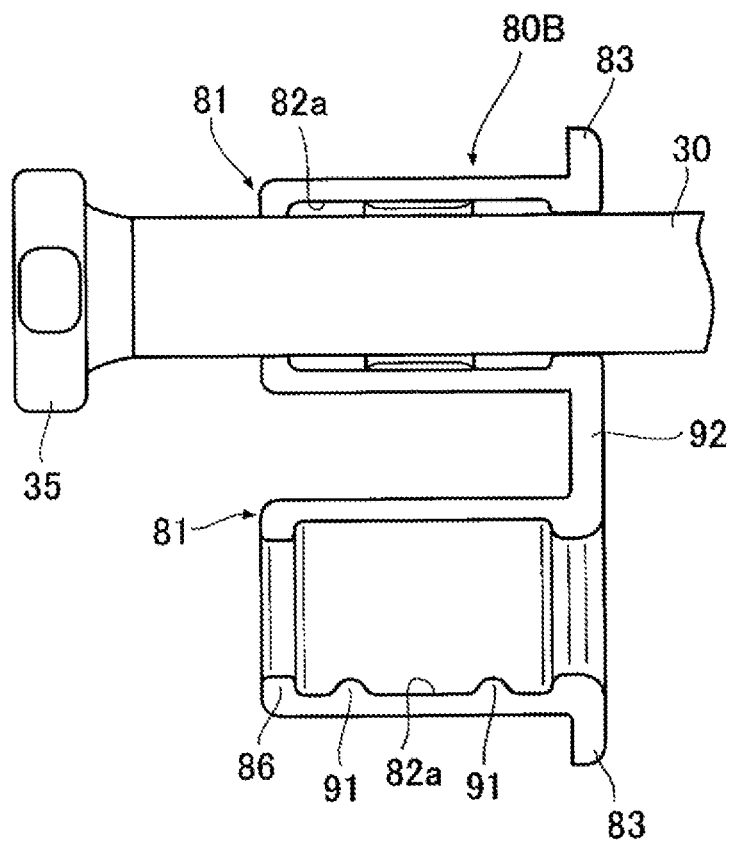
FIG. 24A is an explanatory view when the cap is assembled to the rod.
Figure 24B:
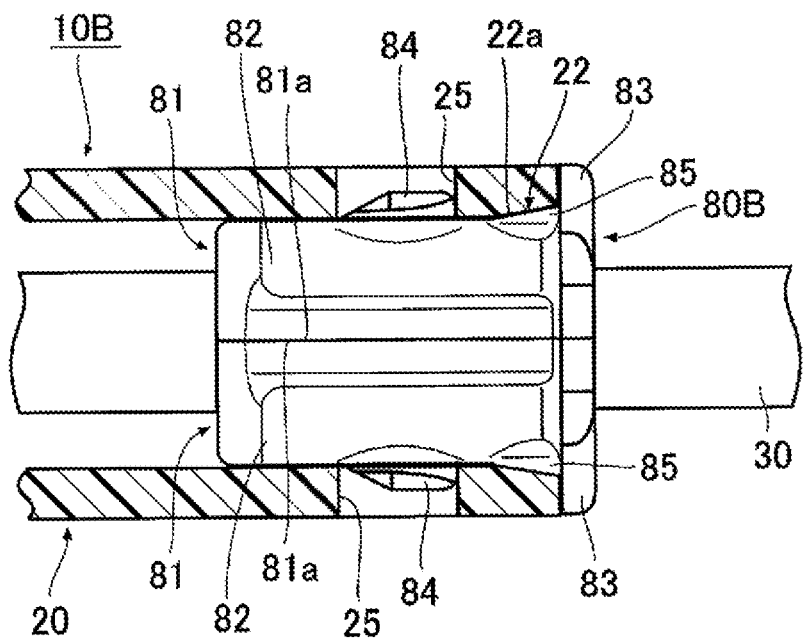
FIG. 24B is an explanatory view of a state in which the cap is attached to the opening of the cylinder.

Then, as illustrated in FIG. 24A, after the pair of half-split members 81, 81 is opened and the one half-split member 81 is disposed on the outer circumference of the rod 30 through the receiving opening 82a, the other half-split member 81 is brought close to the one half-split member 81 through the hinge portion 92 to be disposed on the outer circumference of the rod through the receiving opening 82a, and the pair of half-split members 81, 81 is closed, so that the mating protrusions 90 respectively engage with the recesses 89 of the locking pieces 88, and as illustrated in FIG. 24B, the cap 80B can be assembled to the outer circumference of the rod 30.

Figure 25:
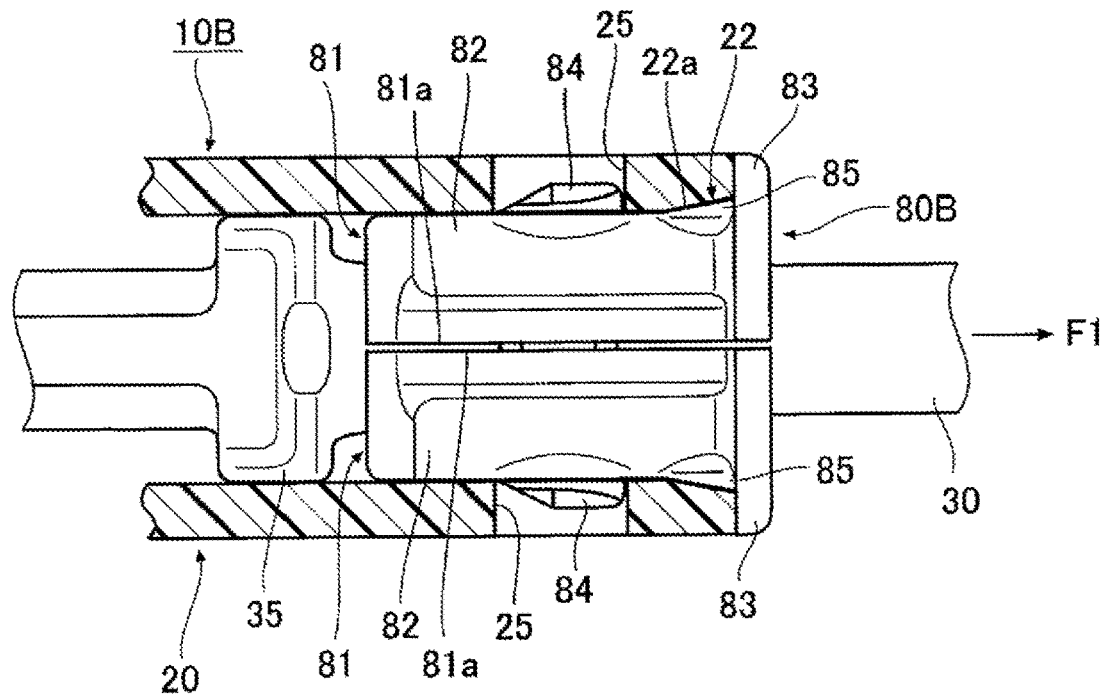
FIG. 25 is an explanatory view of a state in which the rod moves in the damping direction of the damper from the state of FIG. 24B.

Also in this embodiment, as illustrated in FIG. 25, when the rod 30 is maximally pulled out from the opening 22 of the cylinder 20, the rod 30 contacts the protrusion 86 (not shown) on the tip side inner circumference of the cap 80B, and the pair of half-split members 81, 81 increases in diameter, so that it is possible to effectively prevent the cap 80 from slipping out of the opening 22 of the cylinder 20 or from being displaced. Further, in this embodiment, since the pair of half-split members 81, 81 is connected to each other through the hinge portion 92, the parts can be prevented from being lost.

Figure 26:
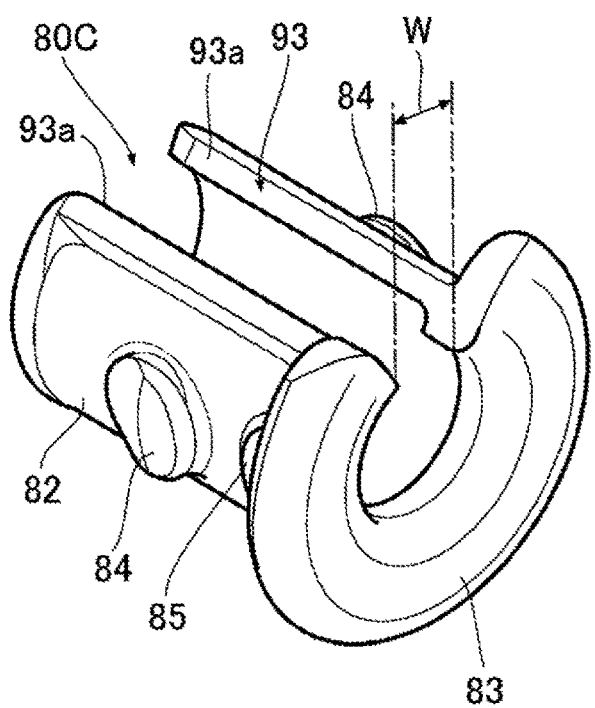
FIG. 26 illustrates a fourth embodiment of the damper according to the present invention, and is a perspective view of the cap constituting the damper.
Figure 27A:
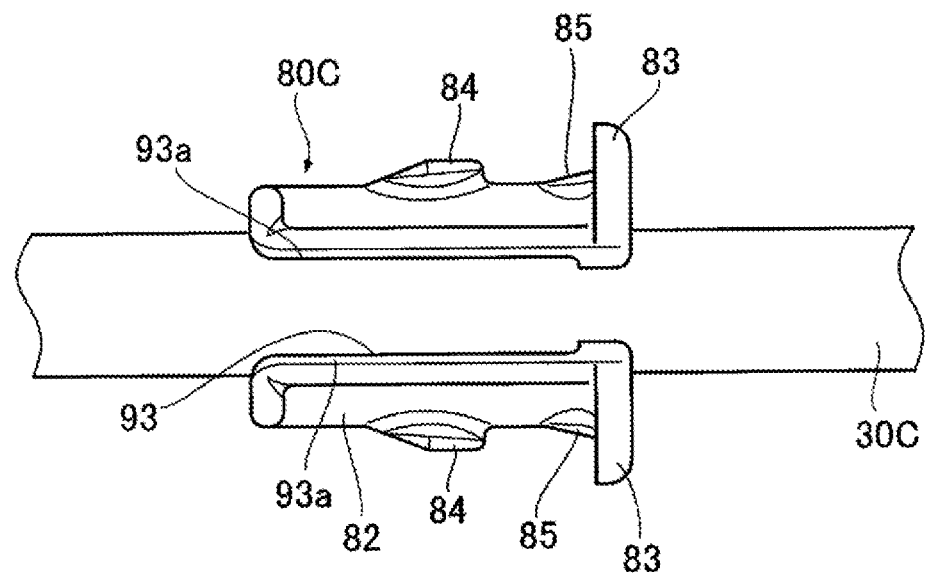
FIG. 27A is an explanatory view of a state in which the cap is attached to the rod.
Figure 27B:
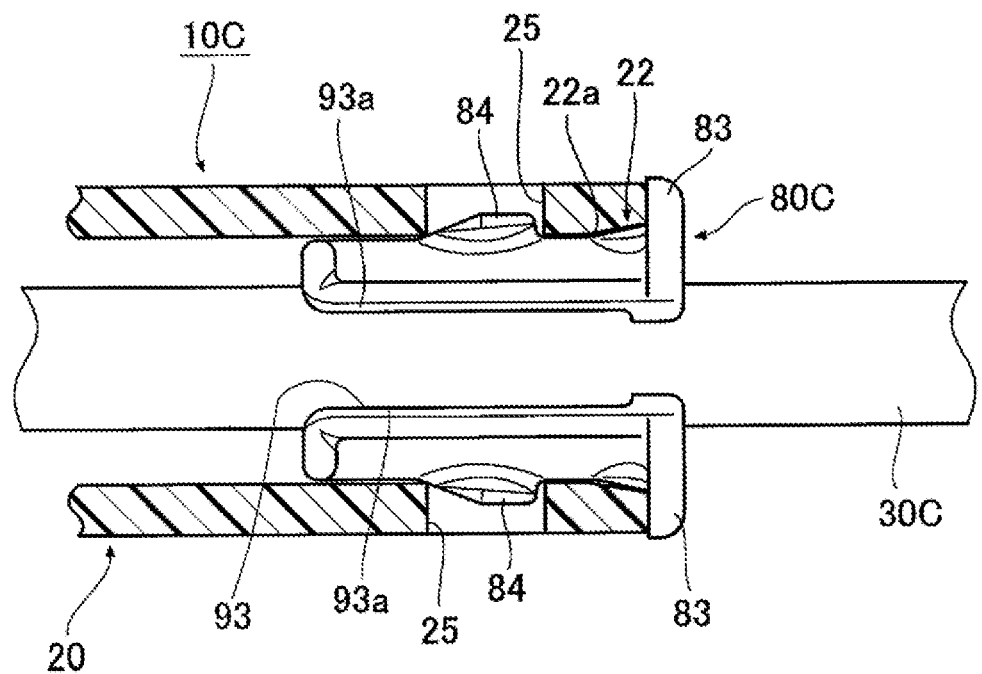
FIG. 27B is an explanatory view of a state in which the cap is attached to the opening of the cylinder.
Figure 28:
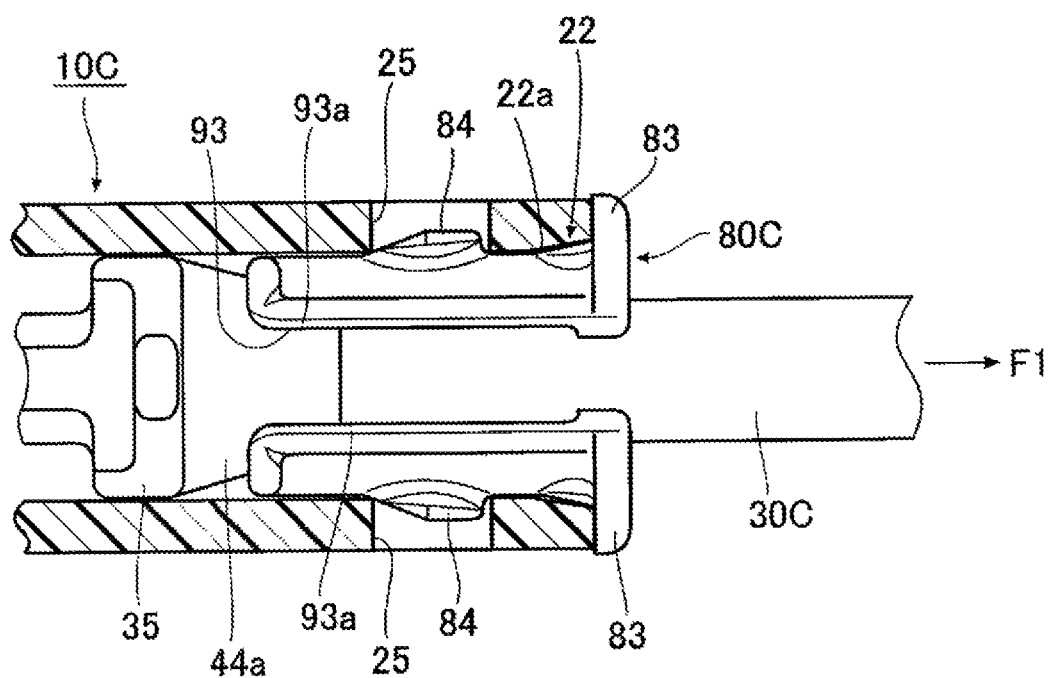
FIG. 28 is an explanatory view of a state in which the rod moves in the damping direction of the damper from the state of FIG. 27B.

FIGS. 26 to 28 illustrate a fourth embodiment of the damper according to the present invention. Note that substantially the same parts as those in the above embodiments are denoted by the same reference numerals and description thereof will be omitted.

A damper 10C of this embodiment is different from the above embodiments in the structure of the cap. As illustrated in FIG. 26, in a cap 80C in this embodiment, a cylindrical peripheral wall, that is, one position in the circumferential direction of the main body 82 is separated by a slit-shaped receiving opening 93 extending in the axial direction, and an axial cross-section of the cap 80C has a substantially C-shape. Further, as illustrated in FIG. 26, both side surfaces 93a, 93a in the axial direction of the slit-shaped receiving opening 93 extending in the axial direction are wide on the radially outer side of the cap 80C and are narrower toward the radially inner side. Note that, as illustrated in FIG. 26, an opening width W of the slit-shaped receiving opening 93, that is, the width W of the both side surfaces 93a, 93a of the slit-shaped receiving opening 93 at the most radially inward position is formed to be smaller than an outer diameter of the rod 30.

A rod 30C of the damper 10C is formed with an inclined portion 44a having a diameter gradually reduced from an outer peripheral edge of the stopper portion 35 toward the base end of the rod. The inclined portion 44a has a shape in which its wall thickness is thicker than that of the inclined portion 44 of the rod 30 of the above embodiments.

In this embodiment, since the cap 80C has a shape in which one position in the circumferential direction of the cylindrical peripheral wall is separated through the slit-shaped receiving opening 93 extending in the axial direction, the cap 80C is disposed with the slit-shaped receiving opening 93 facing radially outward of the rod 30C, and then the cap 80C is pushed in against the rod 30C, so that the slit-shaped receiving opening 93 is pushed and expanded and the rod 30C enters the cap 80C, and as illustrated in FIG. 27A, the cap 80C can be assembled to the outer circumference of the rod 30C, and a shape of the cap 80C can be simplified.

In this embodiment, since the opening width W of the slit-shaped receiving opening 93 of the cap 80C is formed smaller than the outer diameter of the rod 30C, when the cap 80C is assembled to the rod 30C, it can be prevented from easily slipping off from the rod 30C.

Also in this embodiment, as illustrated in FIG. 28, when the rod 30C is maximally pulled out from the opening 22 of the cylinder 20, the inclined portion 44a of the rod 30C pushes and expands the tip side inner circumference of the cap 80C to increase the diameter, and thus it is possible to effectively prevent the cap 80C from slipping out of the opening 22 of the cylinder 20 or from being displaced.

FIGS. 29A, 29B, 30A and 30B illustrate a fifth embodiment of the damper according to the present invention. Note that substantially the same parts as those in the above embodiments are denoted by the same reference numerals and description thereof will be omitted.

Figure 29A:
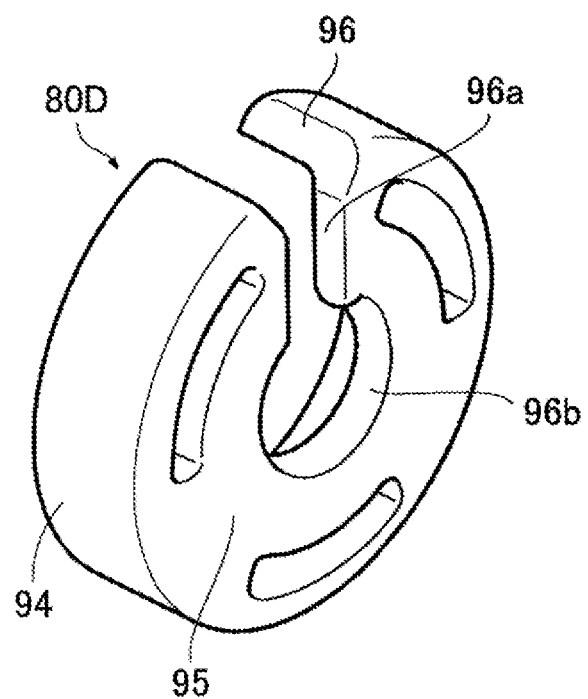
FIGS. 29A and 29B illustrate a fifth embodiment of the damper according to the present invention.
Figure 29B:
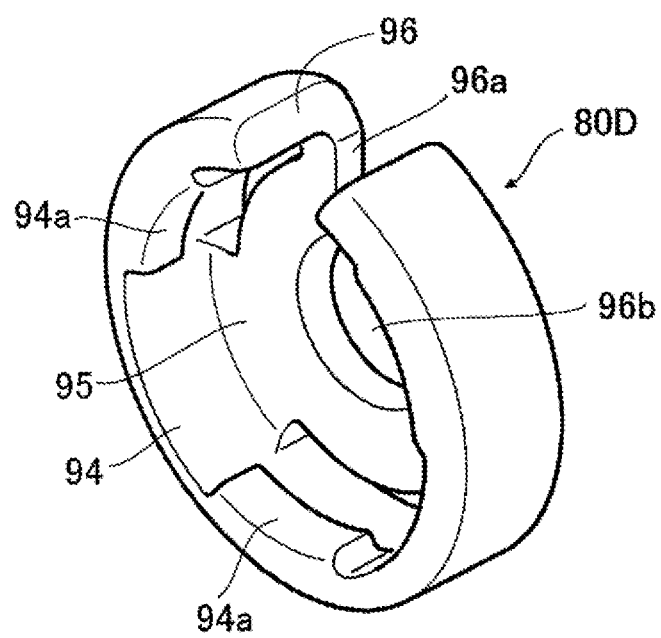

A damper 10D of this embodiment is different from the above embodiments in the structure of the cap. As illustrated in FIGS. 29A and 29B, the cap 80D in this embodiment is disposed on the outer circumference of the wall portion 21 of the cylinder 20, and has a substantially C-shaped cap shape including a main body 94 having a substantially cylindrical shape extending in the axial direction of the rod 30 and partially cut in the circumferential direction and a cover wall 95 disposed on the base end side of the main body 94. Further, a receiving opening 96 is formed at one position in the circumferential direction of the main body 94, the receiving opening 96 being wide on the radially outer side and narrower toward the radially inner side. A receiving passage 96a communicating with the receiving opening 96 and having a constant width is formed in the cover wall 95, a circular rod-supporting hole 96b wider than the receiving passage 96a is formed in the center of the cover wall 95, and the receiving passage 96a, the rod supporting hole 96b and the receiving opening 96 are combined to have a keyhole shape.

Further, as illustrated in FIG. 29B, a plurality of fitting protrusions 94a is provided projecting on a tip side inner circumference of the main body 94. Then, as illustrated in FIG. 30B, the fitting protrusions 94a are fitted to fitting flanges 21a provided projecting on the outer circumference on the axial one end side (opening 22 side) of the cylinder 20, so that the cap 80D can be attached to a base end side outer circumference of the cylinder 20.

Figure 30A:
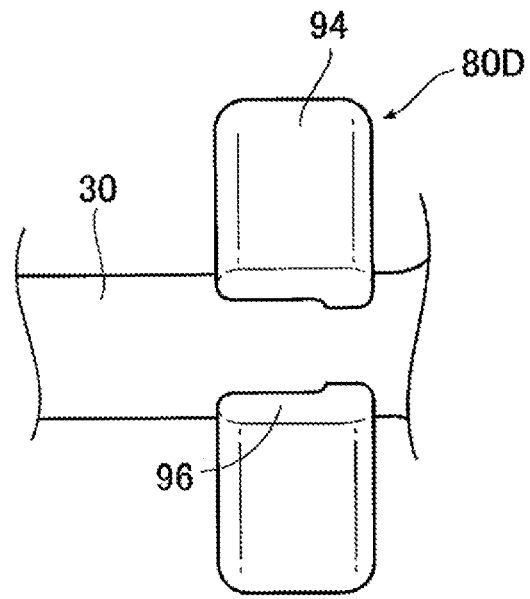
FIG. 30A is an explanatory view of a state in which the cap is attached to the rod.
Figure 30B:
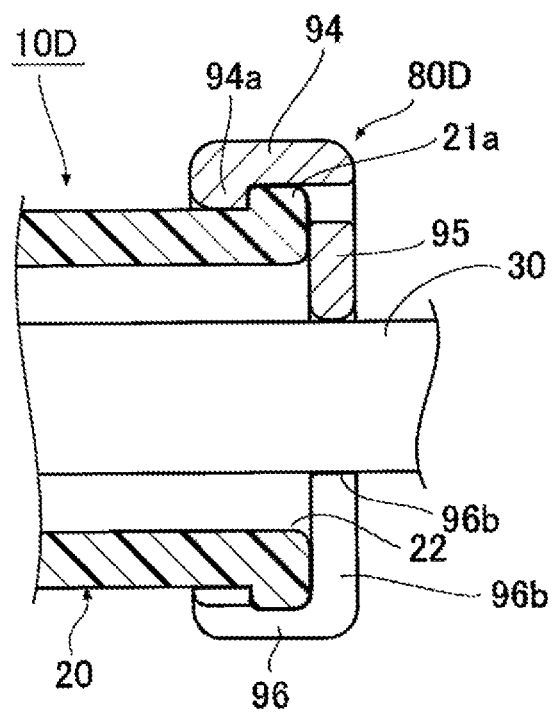
FIG. 30B is an explanatory view of a state in which the cap is attached to the opening of the cylinder.

Then, the cap 80D is disposed with the receiving opening 96 facing radially outward of the rod 30, and then the cap 80D is pushed in against the rod 30, so that the rod 30 entering from the receiving opening 96 is inserted into the cap 80D while pushing and expanding the cap 80D through the receiving passage 96a, and when the rod 30 reaches the rod support hole 96b, the cap 80D elastically returns, and as illustrated in FIG. 30A, the cap 80D can be assembled to the outer circumference of the rod 30. In this state, the rod 30 is inserted and pushed into the opening 22 of the cylinder 20 from the tip side of the rod 30, and the fitting protrusions 94a of the main body 94 are fitted to the fitting flanges 21a on the base end side outer circumference of the cylinder 20, so that the cap 80D can be assembled to the base end side outer circumference of the cylinder 20 with the main body 94 exteriorly mounted.

In the embodiments described above, when the first engaging portion 34 of the rod 30 moves in a direction away from the end wall 23 of the cylinder 20, the damping force is given by the damper, and when the first engaging portion 34 moves in a direction of approaching the end wall 23 of the cylinder 20, the damping force by the damper is released. Conversely, when the first engaging portion of the rod moves in the direction of approaching the end wall of the cylinder (including the cap attached to an end of the cylinder), the damping force may be given by the damper, and when the first engaging portion moves away from the end wall of the cylinder, the damping force may be released.

Figure 31:
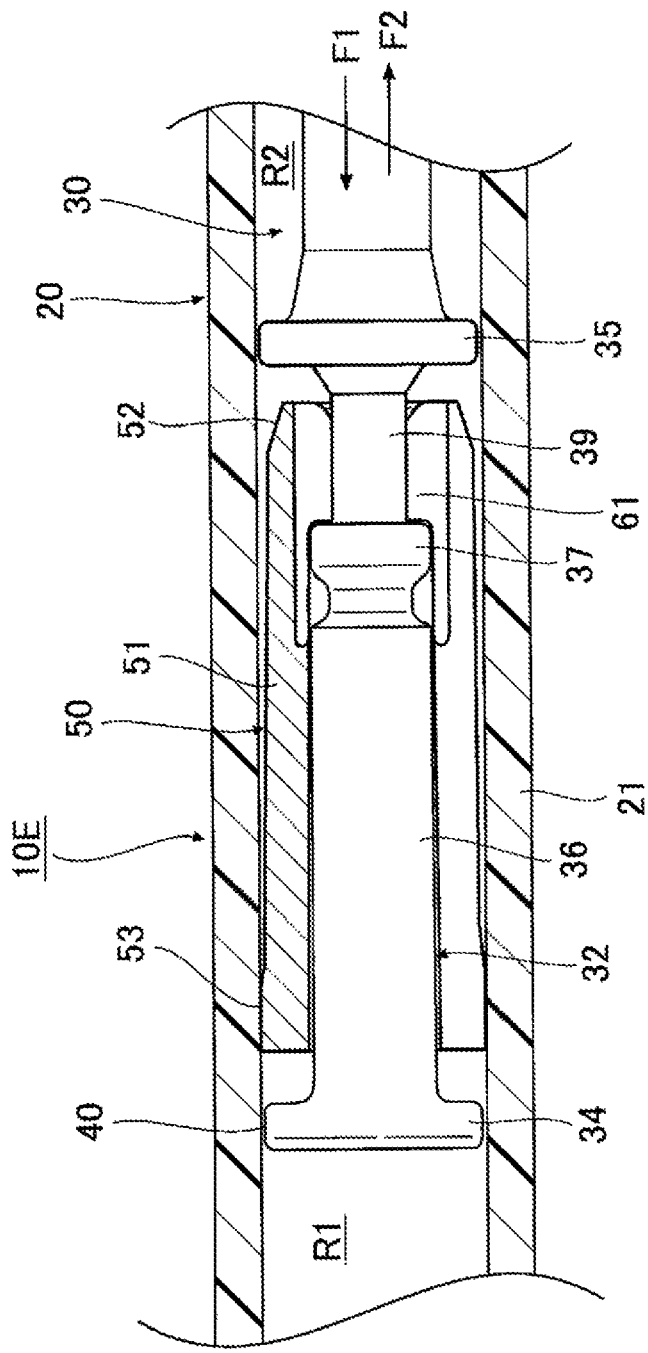
FIG. 31 is an enlarged explanatory view of the main portion of the damper in which the damping direction of the damper is opposite to that of the damper of the above embodiments.

For example, FIG. 31 illustrates an enlarged explanatory view of a main portion of a damper 10E in which the damping direction of the damper is reversed. The damper 10E is different from the above embodiments in the shape of the rod and a mounting direction of the piston. The rod 30 has a shape in which the first pillar portion 36 extends longer than the second pillar portion 39. The piston 50 is mounted on the piston mounting portion 32 of the rod 30 with the one end portion 52 of the piston 50 facing the stopper portion 35 of the rod 30 and a protrusion 53 of the piston 50 facing the first engaging portion 34 of the rod 30, and the mounting direction of the piston 50 is opposite to that of the damper of the above embodiments. Then, when the first engaging portion 34 of the rod 30 moves in the direction approaching the end wall (left side in the drawing) of the cylinder 20 (not shown), that is, when it moves in a direction illustrated by an arrow F1 in FIG. 31, the stopper portion 35 of the rod 30 contacts the one end portion 52 of the piston 50, and the axial compressive force acts between the stopper portion 35 and the protrusion 53, so that the damping force is given by the damper. On the other hand, when the first engaging portion 34 of the rod 30 moves in the direction away from the end wall (not shown) of the cylinder 20, that is, when it moves in a direction illustrated by an arrow F2 in FIG. 31, the second engaging portion 37 of the rod 30 engages with the engaged portion 61 of the piston 50, and the axial tensile force acts on the piston 50, so that the damping force of the damper is released.

The present invention is not limited to the embodiments described above, and various modified embodiments can be made within the scope of the gist of the present invention, and such embodiments are also included in the scope of the present invention.

LIST OF REFERENCE SIGNS 10, 10A, 10B, 10C, 10D, 10E: Damper,
20: Cylinder,
22: Opening,
30, 30C: Rod,
33: Mounting portion,
50: Piston,
53: Pressure contact portion,
80, 80A, 80B, 80C, 80D: Cap,
81: Half-split member,
82, 94: Main body,
82a, 96: Receiving opening,
83: Flange,
83a: Inner surface,
84: Fitting protrusion,
86, 87: Protrusion,
93: Slit-shaped receiving opening.

The invention claimed is:

1. A damper that is attached to a pair of members approaching or separating from each other and gives a damping force when the pair of members approaches or separates from each other, comprising:
   a tubular cylinder that has an opening formed at its end portion and is connected to one of the pair of members;
   a rod that is movably inserted from its tip through the opening of the cylinder; and
   a cap that is attached to the opening of the cylinder and prevents the rod from slipping off from the opening of the cylinder, wherein
   the rod has a piston on its tip side and a mounting portion mounted on the other of the pair of members on its base end side,
   the cap has a main body that extends in an axial direction of the rod, and the main body is formed with a receiving opening that can receive the rod from an outside in a radial direction thereof,
   the cap includes a pair of half-split members having a half-split cylindrical shape, and has a locking unit capable of locking the pair of half-split members to each other when assembled into a cylindrical shape, and
   the locking unit is configured to lock the pair of half-split members so that they can be separated from each other by a predetermined distance, and is configured such that when the rod maximally moves in a withdrawal direction with respect to the cylinder, the rod contacts an inner circumference of the cap and the cap increases in diameter.

2. The damper according to claim 1, wherein the cap is formed with protrusions extending in the circumferential direction on inner circumferences of both ends in the axial direction, a fitting portion that fits the cap into the opening of the cylinder is provided between the cylinder and the cap, and the fitting portion is provided to overlap the protrusions in the circumferential direction of the cap when the cap is viewed in the axial direction.

3. A damper that is attached to a pair of members approaching or separating from each other and gives a damping force when the pair of members approaches or separates from each other, comprising:
   a tubular cylinder that has an opening formed at its end portion and is connected to one of the pair of members;
   a rod that is movably inserted from its tip through the opening of the cylinder; and
   a cap that is attached to the opening of the cylinder and prevents the rod from slipping off from the opening of the cylinder, wherein
   the rod has a piston on its tip side and a mounting portion mounted on the other of the pair of members on its base end side,
   the cap has a main body that extends in an axial direction of the rod, and the main body is formed with a receiving opening that can receive the rod from an outside in a radial direction thereof,
   the cap has a shape in which one position in a circumferential direction of a cylindrical peripheral wall is separated through the receiving opening having a slit-shape extending in the axial direction, and
   the rod is provided with an inclined portion that is gradually reduced in diameter toward the base end of the rod, and when the rod maximally moves in a withdrawal direction with respect to the cylinder, the inclined portion pushes and expands an inner circumference of the cap so that the cap increases in diameter.

4. The damper according to claim 3, wherein an opening width of the slit-shaped receiving opening of the cap is formed smaller than an outer diameter of the rod.

\* \* \* \* \*